(12) United States Patent
Grant et al.

(10) Patent No.: US 10,152,131 B2
(45) Date of Patent: Dec. 11, 2018

(54) SYSTEMS AND METHODS FOR MULTI-PRESSURE INTERACTION ON TOUCH-SENSITIVE SURFACES

(71) Applicant: Immersion Corporation, San Jose, CA (US)

(72) Inventors: Danny Grant, Laval (CA); Juan Manuel Cruz-Hernandez, Montreal (CA); Ali Modarres, Montreal (CA)

(73) Assignee: IMMERSION CORPORATION, San Jose, CA (US)

(*) Notice: Subject to any disclaimer, the term of this patent is extended or adjusted under 35 U.S.C. 154(b) by 0 days.

(21) Appl. No.: 15/405,550

(22) Filed: Jan. 13, 2017

(65) Prior Publication Data

US 2017/0131776 A1 May 11, 2017

Related U.S. Application Data

(63) Continuation of application No. 13/290,502, filed on Nov. 7, 2011, now Pat. No. 9,582,178.

(51) Int. Cl.
*G06F 3/01* (2006.01)
*G06F 3/0488* (2013.01)
(Continued)

(52) U.S. Cl.
CPC .............. *G06F 3/016* (2013.01); *G06F 3/044* (2013.01); *G06F 3/0488* (2013.01);
(Continued)

(58) Field of Classification Search
CPC ........ G06F 3/016; G06F 3/044; G06F 3/0488; G06F 3/04883; G06F 3/04886;
(Continued)

(56) References Cited

U.S. PATENT DOCUMENTS 2,972,140 A   2/1961  Hirsch
3,157,853 A  11/1964  Hirsch
(Continued)

FOREIGN PATENT DOCUMENTS

CN   101809526 A   8/2010
DE   19 831 808    1/1999
(Continued)

OTHER PUBLICATIONS

Adachi et al., "Sensory Evaluation of Virtual Haptic Push-Buttons," 1994, Suzuki Motor Corp., pp. 1-7.
(Continued)

*Primary Examiner* — Fred Tzeng
(74) *Attorney, Agent, or Firm* — Kilpatrick Townsend & Stockton LLP

(57) ABSTRACT

Systems and methods for multi-pressure interaction on touch-sensitive surfaces are disclosed. One disclosed embodiment of a method comprises receiving a first sensor signal from a touch-sensitive input device in response to a first contact of a first object on the touch-sensitive input device, the first sensor signal comprising a first location and a first pressure of the first contact, receiving a second sensor signal from the touch-sensitive input device in response to a second contact of a second object on the touch-sensitive input device substantially simultaneously with the first contact, the second sensor signal comprising a second location of the second contact and a second pressure of the second contact, generating a signal based at least in part on the first sensor signal and the second sensor signal, the signal configured to cause a haptic effect, and outputting the signal.

21 Claims, 11 Drawing Sheets

(51) Int. Cl.
*G10H 1/38* (2006.01)
*G06F 3/044* (2006.01)

(52) U.S. Cl.
CPC ...... *G06F 3/04883* (2013.01); *G06F 3/04886* (2013.01); *G10H 1/38* (2013.01); *G06F 2203/04104* (2013.01); *G06F 2203/04105* (2013.01); *G06F 2203/04806* (2013.01); *G06F 2203/04808* (2013.01); *G10H 2220/096* (2013.01); *G10H 2220/241* (2013.01)

(58) Field of Classification Search
CPC ..... G06F 3/0412; G06F 3/011; G10H 1/0008; G06K 9/00228
USPC ........................................................ 345/174
See application file for complete search history.

(56) References Cited

U.S. PATENT DOCUMENTS

| | | |
|---|---|---|
| 3,220,121 A | 11/1965 | Cutler |
| 3,497,668 A | 2/1970 | Hirsch |
| 3,517,446 A | 6/1970 | Corlyon et al. |
| 3,623,064 A | 11/1971 | Kagan |
| 3,875,488 A | 4/1975 | Crocker et al. |
| 3,902,687 A | 9/1975 | Hightower |
| 3,903,614 A | 9/1975 | Diamond et al. |
| 3,911,416 A | 10/1975 | Feder |
| 3,919,691 A | 11/1975 | Noll |
| 3,923,166 A | 12/1975 | Fletcher et al. |
| 4,000,383 A | 12/1976 | Lockard |
| 4,127,752 A | 11/1978 | Lowthorp |
| 4,160,508 A | 7/1979 | Salsbury |
| 4,221,941 A | 9/1980 | Genovese |
| 4,236,325 A | 12/1980 | Hall et al. |
| 4,262,549 A | 4/1981 | Schwellenbach |
| 4,311,980 A | 1/1982 | Prudenziati |
| 4,333,070 A | 6/1982 | Barnes |
| 4,334,280 A | 6/1982 | McDonald |
| 4,362,408 A | 12/1982 | Cordes et al. |
| 4,383,154 A | 5/1983 | Sorenson |
| 4,398,889 A | 8/1983 | Lam et al. |
| 4,436,188 A | 3/1984 | Jones |
| 4,464,117 A | 8/1984 | Forest |
| 4,477,043 A | 10/1984 | Repperger |
| 4,484,191 A | 11/1984 | Vavra |
| 4,513,235 A | 4/1985 | Acklam et al. |
| 4,560,983 A | 12/1985 | Williams |
| 4,581,491 A | 4/1986 | Boothroyd |
| 4,581,972 A | 4/1986 | Hoshino |
| 4,599,070 A | 7/1986 | Hladky et al. |
| 4,603,284 A | 7/1986 | Pea ley |
| 4,604,016 A | 8/1986 | Joyce |
| 4,689,449 A | 8/1987 | Rosen |
| 4,692,756 A | 9/1987 | Clark |
| 4,706,294 A | 11/1987 | Ouchida |
| 4,708,656 A | 11/1987 | De Vries et al. |
| 4,713,007 A | 12/1987 | Alban |
| 4,725,817 A | 2/1988 | Wihlborg |
| 4,758,165 A | 7/1988 | Tieman et al. |
| 4,772,205 A | 9/1988 | Chlumsky |
| 4,782,327 A | 11/1988 | Kley et al. |
| 4,791,416 A | 12/1988 | Adler |
| 4,794,384 A | 12/1988 | Jackson |
| 4,794,392 A | 12/1988 | Selinko |
| 4,795,296 A | 1/1989 | Jau |
| 4,798,919 A | 1/1989 | Miessler et al. |
| 4,800,721 A | 1/1989 | Cemenska et al. |
| 4,821,030 A | 4/1989 | Batson et al. |
| 4,823,106 A | 4/1989 | Lovell |
| 4,823,634 A | 4/1989 | Culver |
| 4,837,734 A | 6/1989 | Ichikawa et al. |
| 4,839,838 A | 6/1989 | laBiche et al. |
| 4,840,634 A | 6/1989 | Muller |
| 4,853,874 A | 8/1989 | Iwamoto et al. |
| 4,861,269 A | 8/1989 | Meenen, Jr. |
| 4,868,549 A | 9/1989 | Affinito |
| 4,885,565 A | 12/1989 | Embach |
| 4,891,764 A | 1/1990 | McIntosh |
| 4,896,554 A | 1/1990 | Culver |
| 4,906,843 A | 3/1990 | Jones et al. |
| 4,926,879 A | 5/1990 | Sevraln et al. |
| 4,930,770 A | 6/1990 | Baker |
| 4,934,694 A | 6/1990 | McIntosh |
| 4,935,728 A | 6/1990 | Kiev |
| 4,949,119 A | 8/1990 | Moncrief et al. |
| 4,961,038 A | 10/1990 | MacMinn |
| 4,982,918 A | 1/1991 | Kaye |
| 4,983,786 A | 1/1991 | Stevens et al. |
| 4,983,901 A | 1/1991 | Lehmer |
| 5,004,391 A | 4/1991 | Burden |
| 5,007,300 A | 4/1991 | Siva |
| 5,019,761 A | 5/1991 | Kraft |
| 5,022,384 A | 6/1991 | Freels |
| 5,022,407 A | 6/1991 | Horch et al. |
| 5,035,242 A | 7/1991 | Franklin et al. |
| 5,038,089 A | 8/1991 | Szakaly |
| 5,044,956 A | 9/1991 | Behensky et al. |
| 5,053,585 A | 10/1991 | Yaniger |
| 5,065,145 A | 11/1991 | Purcell |
| 5,076,517 A | 12/1991 | Ferranti et al. |
| 5,078,152 A | 1/1992 | Bond |
| 5,095,303 A | 3/1992 | Clark |
| 5,103,404 A | 4/1992 | Mcintosh |
| 5,107,080 A | 4/1992 | Rosen |
| 5,107,262 A | 4/1992 | Cadoz et al. |
| 5,116,051 A | 5/1992 | Moncrief |
| 5,116,180 A | 5/1992 | Fung et al. |
| 5,121,091 A | 6/1992 | Fujiyama |
| 5,139,261 A | 8/1992 | Openiano |
| 5,146,566 A | 9/1992 | Hollis, Jr. et al. |
| 5,165,897 A | 11/1992 | Johnson |
| 5,175,459 A | 12/1992 | Daniel et al. |
| 5,182,557 A | 1/1993 | Lang |
| 5,184,319 A | 2/1993 | Kramer |
| 5,185,561 A | 2/1993 | Good et al. |
| 5,186,629 A | 2/1993 | Rohen |
| 5,186,685 A | 2/1993 | Mangseth et al. |
| 5,189,355 A | 2/1993 | Larkins et al. |
| 5,193,963 A | 3/1993 | McAffee et al. |
| 5,197,003 A | 3/1993 | Moncrief et al. |
| 5,203,563 A | 4/1993 | Loper, III |
| 5,212,473 A | 5/1993 | Louis |
| 5,220,260 A | 6/1993 | Schuler |
| 5,223,658 A | 6/1993 | Suzuki |
| 5,223,776 A | 6/1993 | Radke et al. |
| 5,235,868 A | 8/1993 | Culver |
| 5,237,327 A | 8/1993 | Saltoh et al. |
| 5,240,417 A | 8/1993 | Smithson et al. |
| 5,241,308 A | 8/1993 | Young |
| 5,246,316 A | 9/1993 | Smith |
| 5,264,768 A | 11/1993 | Gregory et al. |
| 5,271,290 A | 12/1993 | Fischer |
| 5,275,174 A | 1/1994 | Cook |
| 5,275,565 A | 1/1994 | Moncrief |
| 5,283,970 A | 2/1994 | Algner |
| 5,286,203 A | 2/1994 | Fuller et al. |
| 5,289,273 A | 2/1994 | Lang |
| 5,296,871 A | 3/1994 | Palcy |
| 5,299,810 A | 4/1994 | Pierce et al. |
| 5,302,132 A | 4/1994 | Corder |
| 5,309,140 A | 5/1994 | Everett |
| 5,313,230 A | 5/1994 | Venolia et al. |
| 5,334,027 A | 8/1994 | Wherlock |
| 5,341,459 A | 8/1994 | Backes |
| 5,354,162 A | 10/1994 | Burden et al. |
| 5,355,148 A | 10/1994 | Anderson |
| 5,376,948 A | 12/1994 | Roberts |
| 5,381,080 A | 1/1995 | Schnell et al. |
| 5,389,849 A | 2/1995 | Asano et al. |
| 5,389,865 A | 2/1995 | Jacobus et al. |
| 5,390,128 A | 2/1995 | Ryan et al. |
| 5,390,296 A | 2/1995 | Crandall et al. |
| 5,396,266 A | 3/1995 | Brimhall |

(56) References Cited

U.S. PATENT DOCUMENTS

| | | |
|---|---|---|
| 5,398,044 A | 3/1995 | Hill |
| 5,399,091 A | 3/1995 | Mitsumoto |
| 5,402,499 A | 3/1995 | Robison et al. |
| 5,402,680 A | 4/1995 | Korenaga |
| 5,405,152 A | 4/1995 | Katanics et al. |
| 5,414,337 A | 5/1995 | Schuler |
| 5,436,622 A | 7/1995 | Gutman et al. |
| 5,437,607 A | 8/1995 | Taylor |
| 5,451,924 A | 9/1995 | Massimino |
| 5,457,479 A | 10/1995 | Chen |
| 5,459,382 A | 10/1995 | Jacobus et al. |
| 5,461,711 A | 10/1995 | Wang et al. |
| 5,466,213 A | 11/1995 | Hogan et al. |
| 5,471,571 A | 11/1995 | Smith et al. |
| 5,473,235 A | 12/1995 | Lance et al. |
| 5,473,344 A | 12/1995 | Bacon et al. |
| 5,489,812 A | 2/1996 | Furuhata et al. |
| 5,491,477 A | 2/1996 | Clark et al. |
| 5,496,174 A | 3/1996 | Garner |
| 5,506,605 A | 4/1996 | Paley |
| 5,512,919 A | 4/1996 | Araki |
| 5,513,100 A | 4/1996 | Parker et al. |
| 5,514,150 A | 5/1996 | Rostoker |
| 5,521,336 A | 5/1996 | Buchanan et al. |
| 5,530,455 A | 6/1996 | Gillick et al. |
| 5,542,672 A | 8/1996 | Meredith |
| 5,547,382 A | 8/1996 | Yamasaki et al. |
| 5,565,887 A | 10/1996 | McCambridge et al. |
| 5,575,761 A | 11/1996 | Hajianpour |
| 5,576,727 A | 11/1996 | Rosenberg et al. |
| 5,577,981 A | 11/1996 | Jarvik |
| 5,583,407 A | 12/1996 | Yamaguchi |
| 5,586,033 A | 12/1996 | Hall |
| 5,587,937 A | 12/1996 | Massie et al. |
| 5,589,828 A | 12/1996 | Armstrong |
| 5,589,854 A | 12/1996 | Tsai |
| 5,591,082 A | 1/1997 | Jensen et al. |
| 5,596,347 A | 1/1997 | Robertson et al. |
| 5,600,777 A | 2/1997 | Wang et al. |
| 5,619,180 A | 4/1997 | Massimino |
| 5,625,576 A | 4/1997 | Massie et al. |
| 5,629,594 A | 5/1997 | Jacobus et al. |
| 5,631,861 A | 5/1997 | Kramer |
| 5,638,060 A | 6/1997 | Kataoka et al. |
| 5,642,469 A | 6/1997 | Hannaford et al. |
| 5,642,806 A | 7/1997 | Karadimas |
| 5,643,087 A | 7/1997 | Marcus |
| 5,656,901 A | 8/1997 | Kurita |
| 5,666,138 A | 9/1997 | Culver |
| 5,666,473 A | 9/1997 | Wallace |
| 5,684,722 A | 11/1997 | Thorner et al. |
| 5,690,582 A | 11/1997 | Ulrich et al. |
| 5,691,747 A | 11/1997 | Amano |
| 5,691,898 A | 11/1997 | Rosenberg' et al. |
| 5,694,013 A | 12/1997 | Stewart et al. |
| 5,709,219 A | 1/1998 | Chen et al. |
| 5,714,978 A | 2/1998 | Yamanaka |
| 5,719,561 A | 2/1998 | Gonzales |
| 5,721,566 A | 2/1998 | Rosen berg et al. |
| 5,724,106 A | 3/1998 | Autrve et al. |
| 5,724,278 A | 3/1998 | Chen et al. |
| 5,729,249 A | 3/1998 | Yasutaka |
| 5,731,804 A | 3/1998 | Rosenberg |
| 5,734,373 A | 3/1998 | Rosenberg et al. |
| 5,736,978 A | 4/1998 | Hasser et al. |
| 5,739,811 A | 4/1998 | Rosenberg et al. |
| 5,742,278 A | 4/1998 | Chen et al. |
| 5,745,715 A | 4/1998 | Pickover et al. |
| 5,754,023 A | 5/1998 | Rosten et al. |
| 5,755,577 A | 5/1998 | Gillio |
| 5,757,358 A | 5/1998 | Osga |
| 5,760,764 A | 6/1998 | Martinelli |
| 5,766,016 A | 6/1998 | Sinclair et al. |
| 5,767,457 A | 6/1998 | Gerpheide et al. |
| 5,767,839 A | 6/1998 | Rosenbell |
| 5,769,640 A | 6/1998 | Jacobus et al. |
| 5,771,037 A | 6/1998 | Jackson |
| 5,781,172 A | 7/1998 | Engel et al. |
| 5,784,052 A | 7/1998 | Kevson |
| 5,785,630 A | 7/1998 | Bobick et al. |
| 5,790,108 A | 8/1998 | Salcudean et al. |
| 5,791,992 A | 8/1998 | Crump et al. |
| 5,796,057 A | 8/1998 | Nakajima et al. |
| 5,802,353 A | 9/1998 | Avila et al. |
| 5,803,243 A | 9/1998 | Nestor et al. |
| 5,805,140 A | 9/1998 | Rosenberg et al. |
| 5,805,165 A | 9/1998 | Thorne, III et al. |
| 5,808,601 A | 9/1998 | Leah et al. |
| 5,808,603 A | 9/1998 | Chen |
| 5,821,921 A | 10/1998 | Osborn et al. |
| 5,823,876 A | 10/1998 | Unbehand |
| 5,825,308 A | 10/1998 | Rosenberg |
| 5,826,710 A | 10/1998 | Kurek |
| 5,831,408 A | 11/1998 | Jacobus et al. |
| 5,835,080 A | 11/1998 | Beeteson et al. |
| 5,836,443 A | 11/1998 | Gernhardt et al. |
| 5,844,392 A | 12/1998 | Peurach et al. |
| 5,857,986 A | 1/1999 | Moriyasu |
| 5,865,303 A | 2/1999 | Gernhardt |
| 5,877,748 A | 3/1999 | Redlich |
| 5,880,714 A | 3/1999 | Rosenberg et al. |
| 5,887,995 A | 3/1999 | Holehan |
| 5,889,670 A | 3/1999 | Schuler et al. |
| 5,889,672 A | 3/1999 | Schuler et al. |
| 5,896,125 A | 4/1999 | Niedzwiecki |
| 5,897,437 A | 4/1999 | Nishiumi et al. |
| 5,903,257 A | 5/1999 | Nishiumi et al. |
| 5,912,661 A | 6/1999 | Siddiqui |
| 5,914,705 A | 6/1999 | Johnson et al. |
| 5,914,708 A | 6/1999 | LaGrange et al. |
| 5,917,906 A | 6/1999 | Thornton |
| 5,929,846 A | 7/1999 | Rosenberg et al. |
| 5,943,044 A | 8/1999 | Martinelli et al. |
| 5,944,151 A | 8/1999 | Jakobs et al. |
| 5,945,772 A | 8/1999 | Macnak et al. |
| 5,956,016 A | 9/1999 | Kruenzneretal |
| 5,956,484 A | 9/1999 | Rosenberg et al. |
| 5,959,613 A | 9/1999 | Rosenberg et al. |
| 5,973,689 A | 10/1999 | Gallerv |
| 5,977,867 A | 11/1999 | Bouin |
| 5,984,785 A | 11/1999 | Takeda et al. |
| 5,986,643 A | 11/1999 | Hamill et al. |
| 5,988,902 A | 11/1999 | Holehan |
| 5,990,869 A | 11/1999 | Kubica et al. |
| 5,999,168 A | 12/1999 | Rosenberg et al. |
| 6,001,014 A | 12/1999 | Ogata |
| 6,004,134 A | 12/1999 | Marcus et al. |
| 6,005,551 A | 12/1999 | Osbomeet et al. |
| 6,008,800 A | 12/1999 | Pryor |
| 6,020,876 A | 2/2000 | Rosenberg et al. |
| 6,024,576 A | 2/2000 | Bevirt et al. |
| 6,028,593 A | 2/2000 | Rosenberg et al. |
| 6,037,927 A | 3/2000 | Rosenberg |
| 6,059,506 A | 5/2000 | Kramer |
| 6,061,004 A | 5/2000 | Rosenberg |
| 6,067,081 A | 5/2000 | Hahlganss et al. |
| 6,067,871 A | 5/2000 | Markyvech et al. |
| 6,078,126 A | 6/2000 | Rollins et al. |
| 6,088,019 A | 6/2000 | Rosenberg |
| 6,088,017 A | 7/2000 | Tremblay et al. |
| 6,097,964 A | 8/2000 | Nuovo et al. |
| 6,100,874 A | 8/2000 | Schena et al. |
| 6,102,803 A | 8/2000 | Takeda et al. |
| 6,111,577 A | 8/2000 | Zilles et al. |
| 6,118,435 A | 9/2000 | Fujita et al. |
| 6,125,385 A | 9/2000 | Wies et al. |
| 6,128,006 A | 10/2000 | Rosenberg |
| 6,130,393 A | 10/2000 | Chu |
| 6,131,097 A | 10/2000 | Peurach et al. |
| 6,140,987 A | 10/2000 | Stein et al. |
| 6,147,422 A | 11/2000 | Delson et al. |
| 6,147,674 A | 11/2000 | Rosenberg et al. |
| 6,160,489 A | 12/2000 | Perry et al. |
| 6,161,126 A | 12/2000 | Wies et al. |

(56) References Cited

U.S. PATENT DOCUMENTS

| | | | |
|---|---|---|---|
| 6,166,723 A | 12/2000 | Schena et al. |
| 6,175,090 B1 | 1/2001 | Blossfald |
| 6,195,592 B1 | 2/2001 | Schuler et al. |
| 6,198,206 B1 | 3/2001 | Saarmaa et al. |
| 6,218,966 B1 | 4/2001 | Goodwin et al. |
| 6,219,034 B1 | 4/2001 | Elbing et al. |
| 6,225,976 B1 | 5/2001 | Yates et al. |
| 6,239,790 B1 | 5/2001 | Martinelli et al. |
| 6,243,078 B1 | 6/2001 | Rosenberg |
| 6,243,080 B1 | 6/2001 | Moine |
| 6,262,717 B1 | 7/2001 | Donahue et al. |
| 6,292,173 B1 | 9/2001 | Rambaldi et al. |
| 6,307,465 B1 | 10/2001 | Kayma et al. |
| 6,326,901 B1 | 12/2001 | Gonzales |
| 6,337,678 B1 | 1/2002 | Fish |
| 6,339,201 B1 | 1/2002 | Balaban et al. |
| 6,342,880 B2 | 1/2002 | Rosenberg et al. |
| 6,344,791 B1 | 2/2002 | Armstrong |
| 6,347,997 B1 | 2/2002 | Armstrong |
| 6,368,016 B1 | 4/2002 | Smith et al. |
| 6,369,803 B2 | 4/2002 | Brisebois et al. |
| 6,373,463 B1 | 4/2002 | Beeks |
| 6,374,255 B1 | 4/2002 | Peurach et al. |
| 6,388,655 B1 | 5/2002 | Leung |
| 6,389,302 B1 | 5/2002 | Vance |
| 6,414,674 B1 | 7/2002 | Kam Der et al. |
| 6,422,941 B1 | 7/2002 | Thorner et al. |
| 6,429,846 B2 | 8/2002 | Rosenberg et al. |
| 6,445,284 B1 | 9/2002 | Cruz-Hernandez et al. |
| 6,447,069 B1 | 9/2002 | Terris et al. |
| 6,469,695 B1 | 10/2002 | White |
| 6,473,069 B1 | 10/2002 | Gemheide |
| 6,476,794 B1 | 11/2002 | Kataoka et al. |
| 6,487,421 B2 | 11/2002 | Hess et al. |
| 6,498,601 B1 | 12/2002 | Gujar et al. |
| 6,509,892 B1 | 1/2003 | Cooper et al. |
| 6,518,958 B1 | 2/2003 | Mivajima et al. |
| 6,525,283 B2 | 2/2003 | Leng |
| 6,529,122 B1 | 3/2003 | Magnussen et al. |
| 6,535,201 B1 | 3/2003 | Cooper et al. |
| 6,543,487 B2 | 5/2003 | Bazinet |
| 6,587,091 B2 | 7/2003 | Serpa |
| 6,597,347 B1 | 7/2003 | Yasutake |
| 6,610,936 B2 | 8/2003 | Gillespie et al. |
| 6,628,195 B1 | 9/2003 | Coudor |
| 6,636,197 B1 | 10/2003 | Goldenberg et al. |
| 6,636,202 B2 | 10/2003 | Islunael et al. |
| 6,639,582 B1 | 10/2003 | Shrader |
| 6,647,145 B1 | 11/2003 | Gay |
| 6,657,617 B2 | 12/2003 | Paolini et al. |
| 6,781,569 B1 | 9/2004 | Gregorio et al. |
| 6,801,191 B2 | 10/2004 | Mukal et al. |
| 6,819,312 B2 | 11/2004 | Fish |
| 6,976,562 B1 | 12/2005 | Perret et al. |
| 7,168,042 B2 | 1/2007 | Braun et al. |
| 8,098,235 B2 * | 1/2012 | Heubel .................. G06F 3/016 |
| | | | 345/156 |
| 8,264,465 B2 | 9/2012 | Grant et al. |
| 9,030,419 B1 | 5/2015 | Freed |
| 9,582,178 B2 * | 2/2017 | Grant .................... G06F 3/0488 |
| 2001/0000663 A1 | 5/2001 | Shahoian et al. |
| 2001/0035854 A1 | 11/2001 | Rosenberg et al. |
| 2002/0033795 A1 | 3/2002 | Shahoian et al. |
| 2002/0044132 A1 * | 4/2002 | Fish ........................ G06F 3/011 |
| | | | 345/156 |
| 2002/0103025 A1 | 8/2002 | Murzanski et al. |
| 2002/0128048 A1 | 9/2002 | Aaltonen et al. |
| 2002/0149561 A1 | 10/2002 | Fukumoto et al. |
| 2002/0149570 A1 | 10/2002 | Knowles et al. |
| 2002/0156807 A1 | 10/2002 | Dieberger |
| 2002/0171621 A1 | 11/2002 | Johnson |
| 2002/0177471 A1 | 11/2002 | Kaaresoja et al. |
| 2003/0006892 A1 | 1/2003 | Church |
| 2003/0016211 A1 | 1/2003 | Woollev |
| 2003/0022701 A1 | 1/2003 | Gupta |
| 2003/0025679 A1 | 2/2003 | Tavlo et al. |
| 2003/0030628 A1 | 2/2003 | SalO et al. |
| 2003/0038776 A1 | 2/2003 | Rosenberg et al. |
| 2003/0048260 A1 | 3/2003 | Matusis |
| 2003/0058265 A1 | 3/2003 | Robinson et al. |
| 2003/0067449 A1 | 4/2003 | Yoshikawa et al. |
| 2003/0071795 A1 | 4/2003 | Baldauf et al. |
| 2003/0095105 A1 | 5/2003 | Vaananen |
| 2003/0122779 A1 | 7/2003 | Martin et al. |
| 2003/0128191 A1 | 7/2003 | Strasser |
| 2003/0128192 A1 | 7/2003 | Van Os |
| 2003/0151597 A1 | 8/2003 | Roberts et al. |
| 2003/0174121 A1 | 9/2003 | PouDvrev et al. |
| 2003/0179190 A1 | 9/2003 | Franzen |
| 2004/0227721 A1 | 11/2004 | Moilanen et al. |
| 2005/0099393 A1 | 5/2005 | Johnson |
| 2006/0149495 A1 * | 7/2006 | Mazalek .................. G06F 3/011 |
| | | | 702/150 |
| 2009/0002328 A1 | 1/2009 | Ullrich et al. |
| 2009/0085878 A1 * | 4/2009 | Heubel .................... G06F 3/016 |
| | | | 345/173 |
| 2010/0026647 A1 | 2/2010 | Abe et al. |
| 2010/0045619 A1 | 2/2010 | Birnbaum et al. |
| 2010/0088654 A1 | 4/2010 | Henhoeffer |
| 2010/0127983 A1 | 5/2010 | Irani et al. |
| 2010/0156818 A1 * | 6/2010 | Burrough ................ G06F 3/016 |
| | | | 345/173 |
| 2010/0171712 A1 | 7/2010 | Cieplinaski et al. |
| 2010/0231508 A1 | 9/2010 | Cruz-Hernandez et al. |
| 2010/0277431 A1 | 11/2010 | Klinghult |
| 2011/0018695 A1 | 1/2011 | Bells et al. |
| 2011/0043527 A1 | 2/2011 | Ording et al. |
| 2011/0261021 A1 | 10/2011 | Modarres et al. |
| 2012/0038582 A1 | 2/2012 | Grant |
| 2012/0081337 A1 | 4/2012 | Camp et al. |
| 2012/0274662 A1 | 11/2012 | Kim et al. |
| 2012/0327172 A1 * | 12/2012 | El-Saban ........... G06K 9/00228 |
| | | | 348/14.02 |
| 2014/0083279 A1 * | 3/2014 | Little .................... G10H 1/0008 |
| | | | 84/609 |
| 2015/0077345 A1 * | 3/2015 | Hwang ................ G06F 3/0412 |
| | | | 345/173 |

FOREIGN PATENT DOCUMENTS

| | | |
|---|---|---|
| EP | 0 085 518 | 1/1983 |
| EP | 0 265 011 | 4/1988 |
| EP | 0 349 086 | 1/1990 |
| EP | 0 607 580 | 7/1994 |
| EP | 0 626 614 | 11/1994 |
| EP | 0 688 125 | 12/1995 |
| EP | 0 556 999 | 5/1998 |
| EP | 1 213 188 | 6/2002 |
| GB | 2 327 366 | 1/1999 |
| JP | H2-185278 | 7/1990 |
| JP | H4-8381 | 1/1992 |
| JP | H5-192449 | 8/1993 |
| JP | H7-24147 | 1/1995 |
| JP | 2001-350592 A | 12/2001 |
| JP | 2002-259059 A | 9/2002 |
| JP | 2008-305174 A | 12/2008 |
| JP | 2010-033455 A | 2/2010 |
| JP | 2010-211509 A | 9/2010 |
| JP | 2010-541071 A | 12/2010 |
| JP | 2011-048606 A | 3/2011 |
| JP | 2011-528826 A | 11/2011 |
| JP | 2013-500517 A | 1/2013 |
| WO | WO 92-00559 | 1/1992 |
| WO | WO 95-20787 | 8/1995 |
| WO | WO 95-20788 | 8/1995 |
| WO | WO 95-32459 | 11/1995 |
| WO | WO 96-28777 | 9/1996 |
| WO | WO 97-12357 | 4/1997 |
| WO | WO 09-718546 A1 | 5/1997 |
| WO | WO 97-21160 | 6/1997 |
| WO | WO 97-31333 | 8/1997 |
| WO | WO 98-08159 | 2/1998 |
| WO | WO 98-24183 | 6/1998 |

(56) References Cited

FOREIGN PATENT DOCUMENTS

| WO | WO 98-58323 | 12/1998 |
|---|---|---|
| WO | WO 00-030026 | 5/2000 |
| WO | WO 02-27645 | 4/2002 |
| WO | WO 02-31807 A1 | 4/2002 |
| WO | WO 01-9110 A1 | 11/2002 |
| WO | WO 03-042805 | 5/2003 |
| WO | 2009/042424 A1 | 4/2009 |
| WO | 2010/009552 A1 | 1/2010 |
| WO | 2011/011552 A1 | 1/2011 |
| WO | WO 11-076248 | 6/2011 |
| WO | 2011/090324 A2 | 7/2011 |
| WO | WO 11-090324 | 7/2011 |

OTHER PUBLICATIONS

Adelstein, et al., "A High Performance Two-Degree-of-Freedom Kinesthetic Interface," MIT, 1992, pp. 108-112.
Akamatsu et al., "Multi modal Mouse: A Mouse-Type Device with Tactile and Force Display," 1994, Presence vol. 3, pp. 73-80.
Atkinson et al., "Computing with Feeling,", Compul. & Gmphics, vol. 2,1977, pp. 97-103.
Batter et al., "Grope-I: A computer Display to the sense of Feel," Proc IFIP Congress, 1971, pp. 759-763.
Bejczy et al., "The Phantom Robot: Predictive Displays for Teleopemtion with Time Delay," IEEE CH2876, Jan. 1990, pp. 546-550.
Brooks, Jr. et al. "Project Grope, Haptic Displays for Scientific Visualization,", Computer Graphics, vol. 24, #4, 1990, pp. 177-184.
Bullolo et al., "Pen-based force Display for Precision Manipulation in Virtual Environments," IEEE 0- 8186-7084-3, 1995, pp. 217-224.
Colgate et al., "Implementation of Stiff Virtual Walls in Force-Reflecting Interfaces," Northwestern University, IL, 1993., pp. 1-8.
Dennerlein et al., "Vibrotactile Feedback for Industrial Telemanipulators," 1997, Sixth Annual Symp. on Haptic Interfaces for Virtual Env. and Teleoperator Systems, ASME IMECE, Dallas, pp. 1-7.
Ellis et al., Design & Evaluation of a High-Performance Prototype Planar Haptic Interface, Dec. 1993, Advances in Robotics, 55-64.
Fischer, et al., "Specification and Design of Input Devices for Teleoperation," IEEE CH2876, Jan. 1990, pp. 540-545.
Gotow et al., "Perception of Mechanical Properties at the Man—Machine Interface," IEEE CH2503-1, 1987, pp. 688-690.
Hannaford et al., "Force-Feedback Cursor Control," NASA Tech Briefs, vol. 13, No. II, 1989, pp. 1-7.
Hannaford et al., "Performance Evaluation of a 6-Axis Generalized Force-Reflecting Teleoperator," IEEE Transactions on Systems, Man, and Cybernetics, vol. 21, No. 3, 1991, pp. 621-623, 631-633.
Hasser, C. et al., "Tactile Feedback with Adaptive Controller for a Force-Reflecting Haptic Display," Parts I and 2, IEEE 0-7803-3131-1,1996, pp. 526-533.
Hasser, C.., "Tactile Feedback for a Force-Reflecting Haptic Display," School of Eng., Univ. of Dayton, Dayton, OH, 1995, pp. 1-98.
Hirota et al., "Development of Surface Display," IEEE 0-7803-1363-1,1993, pp. 256-262.
Howe et al., "Task Performance with a dextrous Teleoperated Hand System," Proc. of SPIE, vol. 1833, 1992, pp. 1-9.
Iwata, H, Artificial Reality with Force-feedback: Development of Desktop Virtual Space with Compact Master Manipulator: Computer Graphics, vol. 24, No. 4, Aug. 1990, pp. 165-170.
Kelley et al., "magic Mouse: Tactile and Kinesthetic Feedback in the Human-Computer Interface using an Electromagnetically Actuated Input-Output Device," Oct. 19, 1993 University of British Columbia, pp. 1-27.
Kelley et al., "On the Development of a Force-Feedback Mouse and its Integration into a graphical user Interface," Nov. 1994, Engineering Congress and Exhibition, pp. 1-8.
Kilpatrick et al., "The Use of Kinesthetic Supplement in an Interactive Graphics System," University of North Carolina, 1976, pp. 1-172.

Kotoku, "A Predictive Display with Force Feedback and its Application to Remote Manipulation System with Transmission Time Delay," Proc. of IEEE-RSJ Int'l Conf. on Intelligent Robots and Systems, Jul. 1992.
Kotoku, et al., "Environment Modeling for the Interactive Display (EMID) Used in Telerobotic Systems," IEEE-RSJ Int'l. Workshop on Intelligent Robots and Systems, Nov. 1991, pp. 999-1004.
Millman et al., "Design of a 4 Degree of Freedom Force-Reflecting Manipuladum with a Specified Force-Torque Workspace," IEEE CH2969-4, 1991, pp. 1488-1493.
Minsky et al., Feeling & Seeing: Issues in Force Display: ACM089791-351-5, 1990, pp. 235-242, 270.
Munch et al., "Intelligent Control for Haptic Displays," Eurograpbics '96, vol. 15, No. 3, 1996, pp. 217-226.
Ouh-Young et al., "Creating an Illusion of Feel: Control Issues in Force Display," Univ. of N. Carolina, 1989, pp. 1-14.
Ouh-Young et al., Using a Manipulator for Force Display in Molecular Docking, IEEE CH2555, 1988, pp. 1824-1829.
Patrick et al., "Design, Construction, and Testing of a Fingertip Tactile Display for Interaction with Virtual and Remote Environments," Master of Science Thesis, M IT Nov. 8, 1990.
Payette et al., "Evaluation of a Force Feedback (Haptic) Computer Printing Device in Zero Gravity," Oct. 17, 1996, ASME Dynamics Systems, vol. 58 pp. 547-553.
Ramstein et al., "The Pantograph: A Large Workspace Haptic Device for a Multimodal Human—Computer Interaction," Computer—Human Interaction, CHI 1994, pp. 1-3.
Ramstein, Combining Haptic & Braille Technologies: Design Issues and Pilot Study, 96, Siggraph pp. 37-44.
Rosenberg et al., "Commercially Viable force feedback Controller for Individuals with Neuromotor Disabilities," Armstrong Laboratory, AUCF-TR-1997-0016, 1996, pp. 1-33.
Rosenberg et al., "Perceptual Decomposition of Virtual Haptic Surfaces," Proc IEEE Symposium on Research Frontiers in Virtual Reality, 1993, pp. 1-8.
Rosenberg et al., "The use of force feedback to enhance graphical user interfaces," Stereoscopic Displays & Virtual Reality Systems, 1996, pp. 243-248.
Rosenberg, "Perceptual Design of a Virtual Rigid Surface Contact," Armstrong Laboratory AUCF-TR-1995-0029, 1993, pp. 1-45.
Rosenberg, "Virtual Haptic Overlays Enhance Performance in Telepresence Tasks," Dept. of Mech. Eng., Stanford Univ., 1994.
Rosenberg, L., "Virtual fixtures as tools to enhance operator performance in telepresence environments," SPIE Manipulator Technology, 1993, pp. 1-12.
Schmult et al., "Application Areas for a Force-Feedback Joystick," 1993, Advances in Robotics, vol. 49, pp. 47-54.
Su et al., "The Virtual Panel Architecture: A 3D Gesture Framework," University of Maryland, pp. 387-393.
Tan, et al., "Manual Resolution of Compliance When Work and Force Cues are Minimized," DSC—vol. 49, Advances in Robotics, Mechatronics, and Haptic Interfaces, ASME 1993, pp. 99-104.
Wiker et al., "Development of Tactile Mice for Blind Access to Computers, Importance of Stimulation Locus, Object Size, and Vibrotactile Display Resolution," 1991, Human Factors Society Mtg., pp. 708-712.
Winey III, "Computer Stimulated Visual & Tactile Feedback as an Aid to Manipulator & Vehicle Control," MIT, 1981, pp. 1-79.
Yamakita, et al., "Tele-Virtual Reality of Dynamic Mechanical Model," Proc. of IEEE/RSJ Int'l. Conf. on Intelligent Robots and Systems, Jul. 1992, pp. 1103-1110.
Yokokohji, et al., "What You Can See is What You Can Feel—Development of a Visual-Haptic Interface to Virtual Environment," Proc. VRALS 1996.
Noll. "Man-Machine Tactile," SIO Journal, Jul./Aug. 1972 Issue.
Rosenberg, Virtual Fixtures: Perceptual Overlays Enhance Operator Performance in Telepresence Tasks: Ph.D. Dissertation, Stanford University, Jun. 1994.
Coaxial Control Shaker part No. C-25502, Safe Flight Instrument Corporation, 26 pages, Jul. 1, 1967; Revised Jan. 28, 2002.
Adelstein, "A Virtual Environment System for the Study of Human Arm Tremor," Ph.D. Dissertation, Dept. of Mechanical Engineering, MIT, Jun. 1989.

(56) References Cited

OTHER PUBLICATIONS

Adelstein, "Design and Implementation of a Force Reflecting Manipulandum for Manual Control research," DSC—vol. 42, Advances in Robotics, Edited by H. Kazerooni, pp. 1-12, 1992.
Aukstakalnis et al., "Silicon Mirage: The Art and Science of Virtual Reality," ISBN 0-938151-82-7, pp. 129-180, 1992.
Balgrie, "Electric Control Loading—A Low Cost, High Performance Alternative," Proceedings, pp. 247-254, Nov. 6-8, 1990.
Bejczy, "Sensors, Controls, and Man-Machine Interface for Advanced Teleoperation," Science, vol. 208, No. 4450, pp. 1327-1335, 1980.
Bejczy, "Generalization of Bilateral Force-Reflecting Control of Manipulators," Proceedings of Fourth CISM-IFToMM, Sep. 8-12, 1981.
Bejczy, et al., "Universal Computer Control System (UCCS) for Space Telerobots," CH2413-3-87-0000-0318501.00 1987 IEEE, 1987.
Bejczy et al., "A Laboratory Breadboard System for Dual-Arm Teleoperation," SOAR '89 Workshop, JSC, Houston, TX, Jul. 25-27, 1989.
Bliss, "Optical-to-Tactile Image Conversion for the Blind," IEEE Transactions on Man-Machine Systems, vol. MMS-11, No. 1, Mar. 1970.
Brooks et al., "Hand Controllers for Teleoperation—A State-of-the-Art Technology Survey and Evaluation," JPL Publication 85-11; NASA-CR-175890; N85-28559, pp. 1-84, Mar. 1, 1985.
Burdea et al., "Distributed Virtual Force Feedback, Lecture Notes for Workshop on Force Display in Virtual Environments and its Application to Robotic Teleoperation," 1993 IEEE International Conference on Robotics and Automation, pp. 25-44, May 2, 1993.
Cadler, "Design of a Force-Feedback Touch-Introducing Actuator for Teleoperator Robot Control," Bachelor of Science Thesis, MIT, Jun. 23, 1983.
Caldwell et al., "Enhanced Tactile Feedback (Tele-Traction) Using a Multi-Functional Sensory System," 1050-4729-93, pp. 955-960, 1993.
Eberhardt et al., "OMAR—A Haptic display for speech perception by deaf and def-blind individuals," IEEE Virtual Reality Annual International Symposium, Seattle, WA, Sep. 18-22, 1993.
Eberhardt et al., "Including Dynamic Haptic Perception by the Hand: System Description and Some Results," DSC—vol. 55-1, Dynamic Systems and Control: vol. 1, ASME 1994.
Fokumoto, "Active Click: Tactile Feedback for Touch Panels," ACM CHI2001 Extended Abstracts, pp. 121-122, Apr. 2001.
Gobel et al., "Tactile Feedback Applied to Computer Mice," International Journal of Human-Computer Interaction, vol. 7, No. 1, pp. 1-24, 1995.
Gotow et al, "Controlled Impedance Test Apparatus for Studying Human Interpretation of Kinesthetic Feedback," WA11-11:00, pp. 332-337.
Howe, "A Force-Reflecting Teleoperated Hand System for the Study of Tactile Sensing in Precision Manipulation," Proceedings of the 1992 IEEE International Conference on Robotics and Automation, Nice, France, May 1992.
IBM Technical Disclosure Bullein, "Mouse Ball-Actuating Device With Force and Tactile Feedback," vol. 32, No. 9B, Feb. 1990.
Iwata, "Pen-based Haptic Virtual Environment," 0-7803-1363-1-93 IEEE, pp. 287-292, 1993.
Jacobsen et al., "High Performance, Dextrous Telerobotic Manipulator With Force Reflection," Intervention-ROV '91 Conference & Exposition, Hollywood, Florida, May 21-23, 1991.
Johnson, "Shape-Memory Alloy Tactile Feedback Actuator," Armstrong Aerospace Medical Research Laboratory, AAMRL-TR-90-039, Aug. 1990.
Jones et al., "A perceptual analysis of stiffness," ISSN 0014-4819 Springer International (Springer-Vertag); Experimental Brain Research, vol. 79, No. 1, pp. 150-156, 1990.
Kaczmarek et al., "Tactile Displays," Virtual Environment Technologies.

Kontarinis et al., "Display of High-Frequency Tactile Information to Teleoperators," Telemanipulator Technology and Space Telerobotics, Won S. Kim, Editor, Proc. SPIE vol. 2057, pp. 40-50, Sep. 7-9, 1993.
Kontarinis et al., "Tactile Display of Vibratory Information in Teleoperation and Virtual Environments," PRESENCE, 4(4):387-402, 1995.
Lake, "Cyberman from Logitech," GameBytes, 1994.
Marcus, "Touch Feedback in Surgery," Proceedings of Virtual Reality and Medicine the Cutting Edge, Sep. 8-11, 1994.
McAffee, "Teleoperator Subsystem-Telerobot Demonsdtrator: Force Reflecting Hand Controller Equipment Manual," JPL D-5172, pp. 1-50, A1-A36, B1-B5, C1-C36, Jan. 1988.
Minsky, "Computational Haptics: The Sandpaper System for Synthesizing Textue for a Force-Feedback Display," Ph.D. Dissertation, MIT, Jun. 1995.
Ouh-Young, "Force Display in Molecular Docking," Order No. 9034744, p. 1-369, 1990.
Ouh-Young, "A Low-Cost Force Feedback Joystick and Its Use in PC Video Games," IEEE Transactions on Consumer Electronics, vol. 41, No. 3, Aug. 1995.
Ouh-Young et al., "The Development of a Low-Cost Force Feedback Joystick and Its Use in the Virtual Reality Environment," Proceedings of the Third Pacific Conference on Computer Graphics and Applications, Pacific Graphics '95, Seoul, Korea, Aug. 21-24, 1995.
Patrick et al., "Design and Testing of a Non-reactive, Fingertip, Tactile Display for Interaction with Remote Environments," Cooperative Intelligent Robotics in Space, Rui J. deFigueiredo et al., Editor, Proc. SPIE vol. 1387, pp. 215-222, 1990.
Pimentel et al., "Virtual Reality: through the new looking glass," $2^{nd}$ Edition; McGraw-Hill, ISBN 0-07-050167-X, pp. 41-202, 1994.
Rabinowitz et al., "Multidimensional tactile displays: Identification of vibratory intensity, frequency, and contractor area," Journal of the Accoustical Society of America, vol. 82, No. 4, Oct. 1987.
Russo, "The Design and Implementation of a Three Degree of Freedom Force Output Joystick," MIT Libraries Archives Aug. 14, 1990, pp. 1-131, May 1990.
Russo, "Controlling Dissipative Magnetic Particle Brakes in Force Reflective Devices," DSC—vol. 42, Advances in Robotics, pp. 63-70, ASME 1992.
Scannell, "Taking a Joystick Ride", Computer Currents, Nov. 1994, Boston Edition, vol. 9 No. 11.
Shimoga, "Finger Force and Touch Feedback Issues in Dexterous Telemanipulation," Proceedings of Fourth Annual Conference on Intelligent Robotic Systems for Space Exploration, Rensselaer Polytechnic Institute, Sep. 30-Oct. 1, 1992.
SMK Corporation, "Multi-Functional Touch Panel, Force-Feedback Type, Developed: A Touch Panel Providing a Clicking Feeling," http:--www.smk.co.jp-whatsnew_e-628csc_e.html, Sep. 30, 2002.
SMK Corporation, "Force Feedback Type Optical Touch Panel Developed," SMK Corporation Website, Oct. 30, 2002.
Snow et al., "Model-X Force-Reflecting-Hand-Controller," NT Control No. MPO-17851; JPL Case No. 5348, pp. 1-4, Jun. 15, 1989.
Stanley et al., "Computer Simulation of Interacting Dynamic Mechanical Systems Using Distributed Memory Parallel Processors," DSV—vol. 42, Advances in Robotics, pp. 55-61, ASME 1992.
Tadros, Control System Design for a Three Degree of Freedom Virtual Environment Simulator Using Motor-Brake Palr Actuators, MIT Archive © Massachusetts Institute of Technology, pp. 1-88, Feb. 1990.
Terry et al., "Tactile Feedback in a Computer Mouse," Proceedings of Fourteenth Annual Northeast Bioengineering Conference, University of New Hampshire, Mar. 10-11, 1988.
Wiker, "Teletouch Display Development: Phase 1 Report," Technical Report 1230, Naval Ocean Systems Center, San Diego, Apr. 17, 1989.
Wakiwaka et al., Influence of Mover Support Structure on linear Oscillatory Actuator for cellular Phones, The Third International Symposium on Linear Drives for Industry Applications, 2001, p. 260-263, Japan.

(56) References Cited

OTHER PUBLICATIONS

Bejczy et al., Kinesthetic Coupling between Operator and Remote Manipulator, International Computer Technology Conference, The American Society of Mechanical Engineers, San Francisco, CA, Aug. 12-15, 1980.

ComTouch: A Vibrotactile Communication Device, 2002.

Nissha Printing Co. Ltd., News, web page available at http://www.nissha.co.jp/english/news/2010/02/news-382.html, as available via the Internet and printed Apr. 5, 2011.

Japanese Patent Office, Notice of Reasons for Rejection, Application No. JP 2012-241448 dated May 10, 2016.

European Patent Office, Communication pursuant to Article 94(3) EPC, Application No. 12191217 dated Mar. 11, 2016.

European Patent Office, Extended European Search Report, European Application No. EP13178283, dated Mar. 21, 2014.

Chinese Patent Office, Chinese Application No. 201210442566.0, Office Action dated Jul. 26, 2016, 28 pages.

Chinese Patent Office, Chinese Application No. 201210442566.0, Office Action dated Mar. 14, 2017, 9 pages.

Japanese Patent Office, Japanese Application No. 2012-241448, Office Action dated Feb. 21, 2017, 7 pages.

Japanese Patent Office Application No. 2012-241448, Office Action dated Oct. 3, 2017, 4 pages.

European Patent Office Application No. 1219217.4, Summons to Attend Oral Proceedings dated Sep. 18, 2017, 9 pages.

JP 2017-157477, "Office Action", dated Jun. 19, 2018, 6 pages.

\* cited by examiner

SYSTEMS AND METHODS FOR MULTI-PRESSURE INTERACTION ON TOUCH-SENSITIVE SURFACES

CROSS-REFERENCE TO RELATED APPLICATIONS

This application is a continuation of U.S. application Ser. No. 13/290,502, filed Nov. 7, 2011, entitled "Systems and Methods for Multi-Pressure Interaction on Touch-Sensitive Surfaces," the entirety of which is hereby incorporated by reference.

FIELD OF THE INVENTION

The present disclosure relates generally to systems and methods for multi-pressure interaction on touch-sensitive surfaces.

BACKGROUND

With the increase in popularity of handheld devices, especially mobile phones having touch-sensitive surfaces (e.g., touch screens), physical tactile sensations which have traditionally been provided by mechanical buttons no longer apply in the realm of these new generations of devices. Instead, haptic effects may be output by handheld devices to alert the user to various events. Such haptic effects may include vibrations to indicate a button press, an incoming call, or a text message, or to indicate error conditions.

SUMMARY

Embodiments of the present invention provide systems and methods for multi-pressure interaction on touch-sensitive surfaces. For example, in one embodiment of a method disclosed herein, the method comprises receiving a first sensor signal from a touch-sensitive input device in response to a first contact of a first object on the touch-sensitive input device, the first sensor signal comprising a first location and a first pressure of the first contact, receiving a second sensor signal from the touch-sensitive input device in response to a second contact of a second object on the touch-sensitive input device substantially simultaneously with the first contact, the second sensor signal comprising a second location of the second contact and a second pressure of the second contact, generating a signal based at least in part on the first sensor signal and the second sensor signal, the signal configured to cause a haptic effect, and outputting the signal. In another embodiment, a computer-readable medium comprises program code for causing a processor to execute such a method.

These illustrative embodiments are mentioned not to limit or define the invention, but rather to provide examples to aid understanding thereof. Illustrative embodiments are discussed in the Detailed Description, which provides further description of the invention. Advantages offered by various embodiments of this invention may be further understood by examining this specification.

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments.

DETAILED DESCRIPTION

Example embodiments are described herein in the context of systems and methods for multi-pressure interaction on touch-sensitive surfaces. Those of ordinary skill in the art will realize that the following description is illustrative only and is not intended to be in any way limiting. Other embodiments will readily suggest themselves to such skilled persons having the benefit of this disclosure. Reference will now be made in detail to implementations of example embodiments as illustrated in the accompanying drawings. The same reference indicators will be used throughout the drawings and the following description to refer to the same or like items.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Illustrative Operation of a Multi-Pressure Touch-Sensitive Input Device

Figure 1:
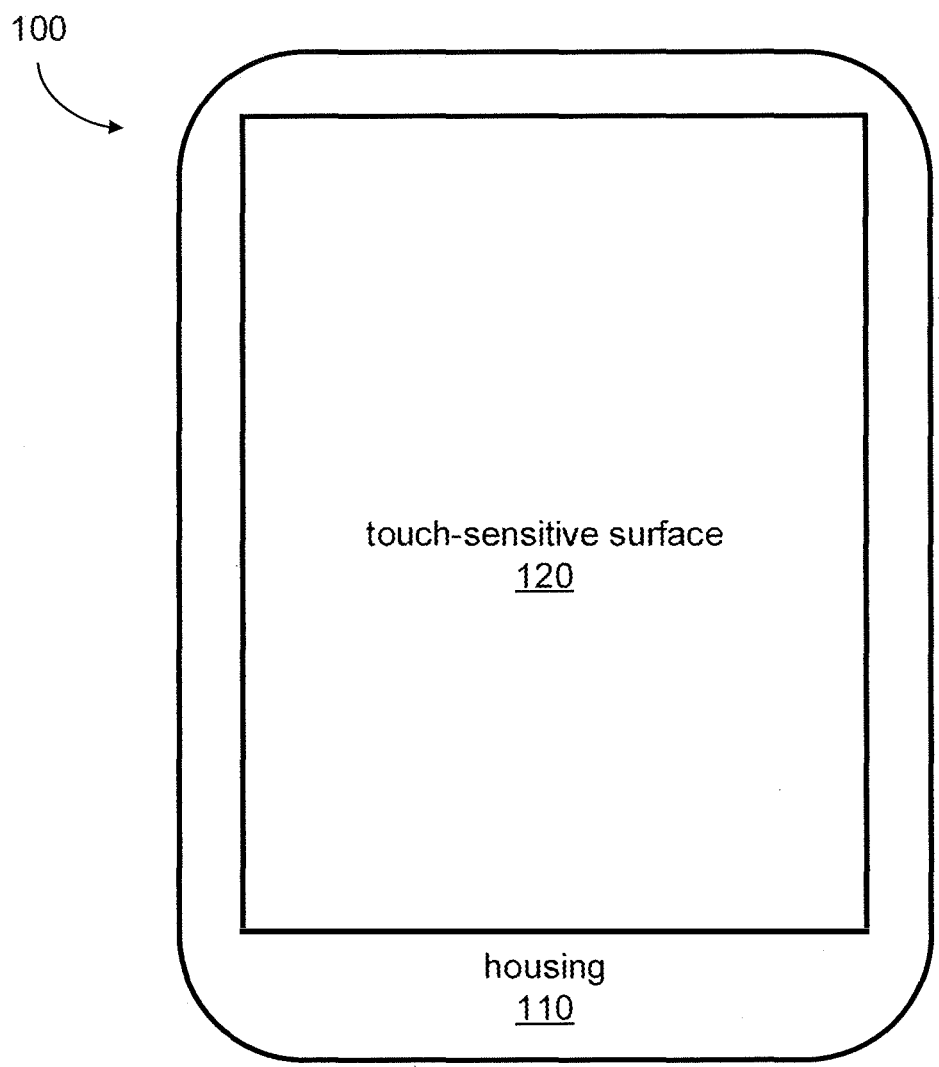
FIG. 1 shows a multi-pressure touch-sensitive input device according to an embodiment of the present invention.

Referring to FIG. 1, FIG. 1 shows a multi-pressure touch-sensitive input device 100 according to an embodiment of the present invention. The device 100 displays a portion of a web page to a user. In this illustrative embodiment, a user may navigate the page using multi-touch, multi-pressure inputs on the touch-sensitive surface 120. For example, if the user touches the touch-sensitive surface 120 substantially simultaneously with two fingers and applies more pressure with a finger located nearer the bottom of the screen than the other finger, the device 100 will cause the display to scroll down the web page. Alternatively, the user could apply more pressure with a finger located nearer the top of the screen than the other finger to cause the device 100 to scroll up the web page. In some embodiments, the rate or speed of scrolling is based at least in part on two or more pressures. For example, the rate of scrolling may be a function of the difference in two pressures. In one embodiment, a haptic effect is output with a frequency or magnitude corresponding to the rate of scrolling.

In addition to scrolling the web page based on the user-applied multi-pressure inputs, the device 100 also outputs haptic effects to indicate the action taken in response to the input. For example, while scrolling down the web page, the device 100 may output a haptic effect that seems to travel from the top of the device 100 to the bottom of the device 100, and cycle repeatedly while the user continues to scroll the web page. Or if the user is scrolling up the web page, the haptic effect starts at the bottom of the device 100 and seems to travel toward the top of the device 100, and cycle repeatedly while the user continues to scroll the web page. Thus, a user is able to provide multi-touch, multi-pressure input to interact with a device 100 and receive haptic feedback based on the input.

This illustrative example is given to introduce the reader to the general subject matter discussed herein. The invention is not limited to this example. The following sections describe various additional non-limiting embodiments and examples of devices, systems, and methods for multi-pressure interaction on touch-sensitive surfaces.

Illustrative Multi-Pressure Touch-Sensitive Input Device

Figure 2:
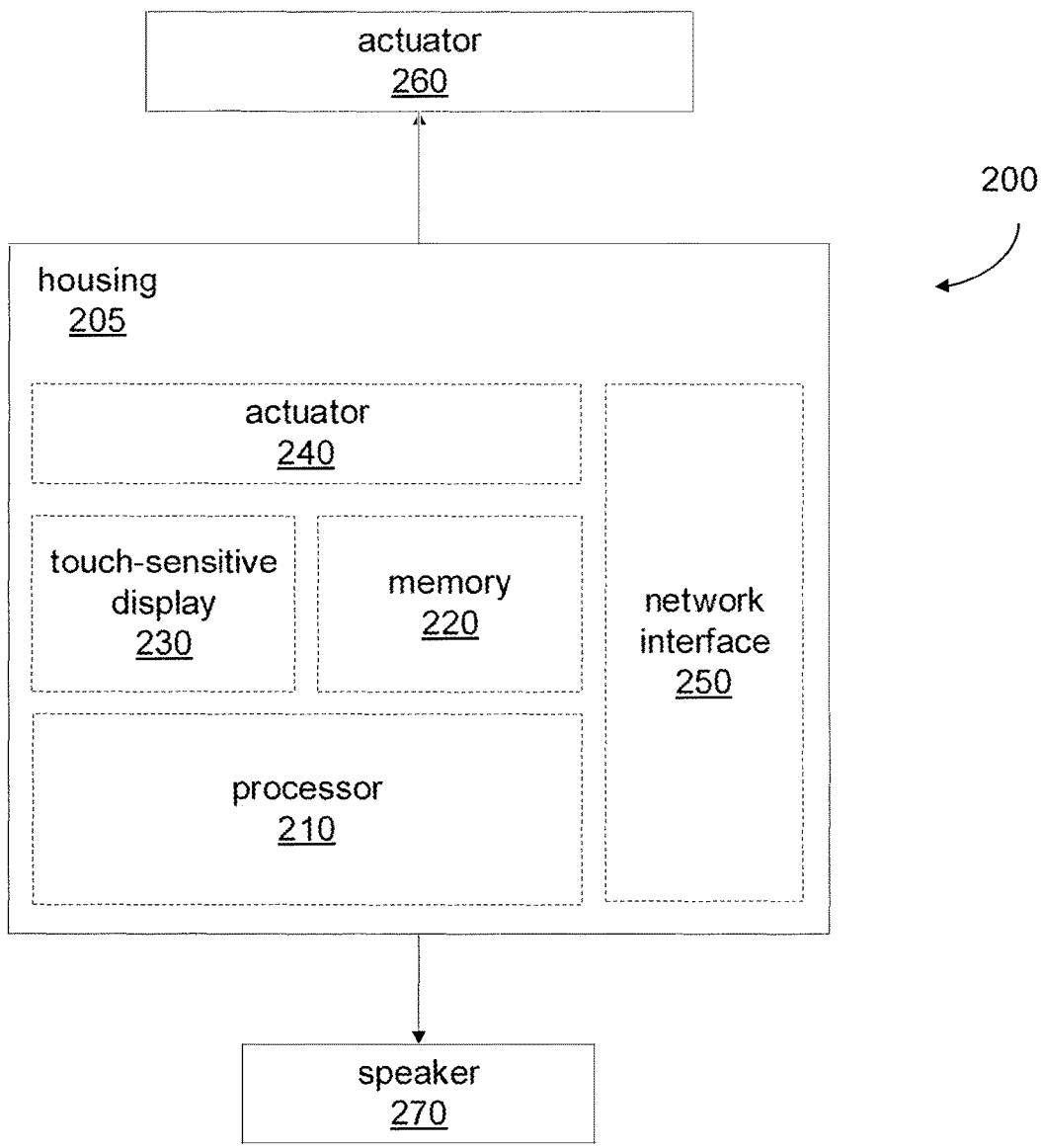
FIG. 2 illustrates a multi-pressure touch-sensitive input device according to an embodiment of the present invention.

Referring now to FIG. 2, FIG. 2 illustrates a multi-pressure touch-sensitive input device 200 according to an embodiment of the present invention. In the embodiment shown in FIG. 2, the device 200 comprises a housing 205, a processor 210, a memory 220, a touch-sensitive display 230, an actuator 240, and a network interface 250. The processor 210 and the memory 220 are disposed within the housing 205. The touch-sensitive display 230, which comprises or is in communication with a touch-sensitive surface, is partially disposed within the housing 205 such that at least a portion of the touch-sensitive display 230 is exposed to a user of the device 200. In some embodiments, the touch-sensitive display 230 may not be disposed within the housing 205. For example, the device 200 may be connected to or otherwise in communication with a touch-sensitive display 230 disposed within a separate housing.

In the embodiment shown in FIG. 2, the touch-sensitive display 230 is in communication with the processor 210 and is configured to provide signals to the processor 210, which is also in communication with memory 220. The memory 220 stores program code or other data, or both, for use by the processor 210 and the processor 210 executes program code stored in memory 220 and receives signals from the touch-sensitive display 230. The processor 210 is also configured to output signals to cause the touch-sensitive display 230 to output images. In the embodiment shown in FIG. 2, the processor 210 is in communication with the network interface 250 and is configured to receive signals from the network interface 250 and to output signals to the network interface 250 to communicate with other components or devices. In addition, the processor 210 is in communication with actuator 240 and actuator 260 and is further configured to output signals to cause actuator 240 or actuator 260, or both, to output one or more haptic effects. Furthermore, the processor 210 is in communication with speaker 270 and is configured to output signals to cause speaker 270 to output sounds. In various embodiments, the device 200 may comprise or be in communication with fewer or additional components or devices. A detailed description of the components of the device 200 shown in FIG. 2 and components that may be in association with the device 200 is described below.

The multi-pressure touch-sensitive input device 200 can be any device that comprises or is in communication with a touch-sensitive surface that is capable of detecting pressures associated with at least two contacts on the touch-sensitive surface. For example, the device 200 of FIG. 2 includes a touch-sensitive display 230 that comprises a touch-sensitive surface. In some embodiments, a touch-sensitive surface may be overlaid on the display 230. In other embodiments, the device 200 may comprise or be in communication with a display and a separate touch-sensitive surface.

In some embodiments, one or more touch-sensitive surfaces may be on one or more sides of the device 200. For example, in one embodiment, a touch-sensitive surface is disposed within or comprises a rear surface of the device 200. In another embodiment, a first touch-sensitive surface is disposed within or comprises a rear surface of the device 200 and a second touch-sensitive surface is disposed within or comprises a side surface of the device 200. Furthermore, in embodiments where the device 200 comprises at least one touch-sensitive surface on one or more sides of the device 200 or in embodiments where the device 200 is in communication with an external touch-sensitive surface, the display 230 may or may not comprise a touch-sensitive surface. In some embodiments, one or more touch-sensitive surfaces may have a flexible touch-sensitive surface. In other embodiments, one or more touch-sensitive surfaces may be rigid. In various embodiments, the device 200 may comprise both flexible and rigid touch-sensitive surfaces.

In various embodiments, the device 200 may comprise or be in communication with fewer or additional components than the embodiment shown in FIG. 2. For example, in one embodiment, the device 200 is not in communication with speaker 270 and does not comprise actuator 240. In another embodiment, the device 200 does not comprise a touch-sensitive display 230 or a network interface 250, but comprises a touch-sensitive surface and is in communication with an external display. In other embodiments, the device 200 may not comprise or be in communication with an actuator at all. Thus, in various embodiments, the multi-pressure touch-sensitive input device 200 may comprise or be in communication with any number of components, such as in the various embodiments disclosed herein as well as variations that would be apparent to one of skill in the art.

The housing 205 of the device 200 shown in FIG. 2 provides protection for at least some of the components device 200. For example, the housing 205 may be a plastic casing that protects the processor 210 and memory 220 from foreign articles such as rain. In some embodiments, the housing 205 protects the components in the housing 205 from damage if the device 200 is dropped by a user. The housing 205 can be made of any suitable material including but not limited to plastics, rubbers, or metals. Various embodiments may comprise different types of housings or a plurality of housings. For example, in some embodiments, the multi-pressure touch-sensitive input device 200 may be a cell phone, personal digital assistant (PDA), laptop, tablet computer, desktop computer, digital music player, gaming console, gamepad, medical instrument, etc. In other embodiments, the device 200 may be embedded in another device such as, for example, the console of a car.

In the embodiment shown in FIG. 2, the touch-sensitive display 230 provides a mechanism for a user to interact with the multi-pressure touch-sensitive input device 200. For example, the touch-sensitive display 230 detects the location and pressure of a user's finger in response to a user hovering over, touching, or pressing the touch-sensitive display 230 (all of which may be referred to as a contact in this disclosure). In some embodiments, the touch-sensitive display 230 may comprise, be connected with, or otherwise be in communication with one or more sensors that determine the location, pressure, or both, of one or more contacts on the touch-sensitive display 230. For example, in one embodiment, the touch-sensitive display 230 comprises or is in communication with a mutual capacitance system. In another embodiment, the touch-sensitive display 230 comprises or is in communication with an absolute capacitance system. In some embodiments, the touch-sensitive display 230 may comprise or be in communication with a resistive panel, a capacitive panel, infrared LEDs, photodetectors, image sensors, optical cameras, or a combination thereof. Thus, the touch-sensitive display 230 may incorporate any suitable technology to determine a contact on the touch-sensitive surface 120 such as, for example, resistive, capacitive, infrared, optical, thermal, dispersive signal, or acoustic pulse technologies, or a combination thereof.

In the embodiment shown in FIG. 2, actuators 240 and 260 are in communication with the processor 210 and are configured to provide one or more haptic effects. For example, in one embodiment, when an actuation signal is provided to actuator 240, actuator 260, or both, by the processor 210, the respective actuator 240, 260 outputs a haptic effect based on the actuation signal. For example, in the embodiment shown, the processor 210 is configured to transmit an actuator signal to actuator 240 comprising an analog drive signal. However, the processor 210 is configured to transmit a command to actuator 260, wherein the command includes parameters to be used to generate an appropriate drive signal to cause the actuator 260 to output the haptic effect. In other embodiments, different signals and different signal types may be sent to each of one or more actuators. For example, in some embodiments, a processor may transmit low-level drive signals to drive an actuator to output a haptic effect. Such a drive signal may be amplified by an amplifier or may be converted from a digital to an analog signal, or from an analog to a digital signal using suitable processors or circuitry to accommodate the particular actuator being driven.

An actuator, such as actuators 240 or 260, can be any component or collection of components that is capable of outputting one or more haptic effects. For example, an actuator can be one of various types including, but not limited to, an eccentric rotational mass (ERM) actuator, a linear resonant actuator (LRA), a piezoelectric actuator, a voice coil actuator, an electro-active polymer (EAP) actuator, a memory shape alloy, a pager, a DC motor, an AC motor, a moving magnet actuator, an E-core actuator, a smartgel, an electrostatic actuator, an electrotactile actuator, or any other actuator or collection of components that perform the functions of an actuator. Multiple actuators or different-sized actuators may be used to provide a range of vibrational frequencies, which may be actuated individually or simultaneously. Various embodiments may include a single or multiple actuators and may have the same type or a combination of different types of actuators.

In various embodiments, one or more haptic effects may be produced in any number of ways or in a combination of ways. For example, in one embodiment, one or more vibrations may be used to produce a haptic effect, such as by rotating an eccentric mass or by linearly oscillating a mass. In some such embodiments, the haptic effect may be configured to impart a vibration to the entire device or to only one surface or a limited part of the device. In another embodiment, friction between two or more components or friction between at least one component and at least one contact may be used to produce a haptic effect, such as by applying a brake to a moving component, such as to provide resistance to movement of a component or to provide a torque. In other embodiments, deformation of one or more components can be used to produce a haptic effect. For example, one or more haptic effects may be output to change the shape of a surface or a coefficient of friction of a surface. In an embodiment, one or more haptic effects are produced by creating electrostatic forces that are used to change friction on a surface. In other embodiments, an array of transparent deforming elements may be used to produce a haptic effect, such as one or more areas comprising a smartgel.

In FIG. 2, the network interface 250 is in communication with the processor 210 and provides wired or wireless communications, from the device 200 to other components or other devices. For example, the network interface 250 may provide wireless communications between the device 200 and a wireless speaker or a wireless actuation device. In some embodiments, the network interface 250 may provide communications to one or more other devices, such as another device 200, to allow users to interact with each other at their respective devices. The network interface 250 can be any component or collection of components that enables the multi-pressure touch-sensitive input device 200 to communicate with another component or device. For example, the network interface 250 may comprise a PCI network adapter, a USB network adapter, or an Ethernet adapter. The network interface 250 may communicate using wireless Ethernet, including 802.11 a, g, b, or n standards. In one embodiment, the network interface 250 can communicate using Bluetooth, CDMA, GSM, TDMA, FDMA, or other wireless technology. In other embodiments, the network interface 250 may communicate through a wired connection and may be in communication with one or more networks, such as Ethernet, token ring, USB, FireWire 1394, etc. And while the embodiment shown in FIG. 2 comprises a network interface 250, other embodiments may not comprise a network interface 250.

Illustrative Method of Detecting and Responding to a Contact

Figure 3:
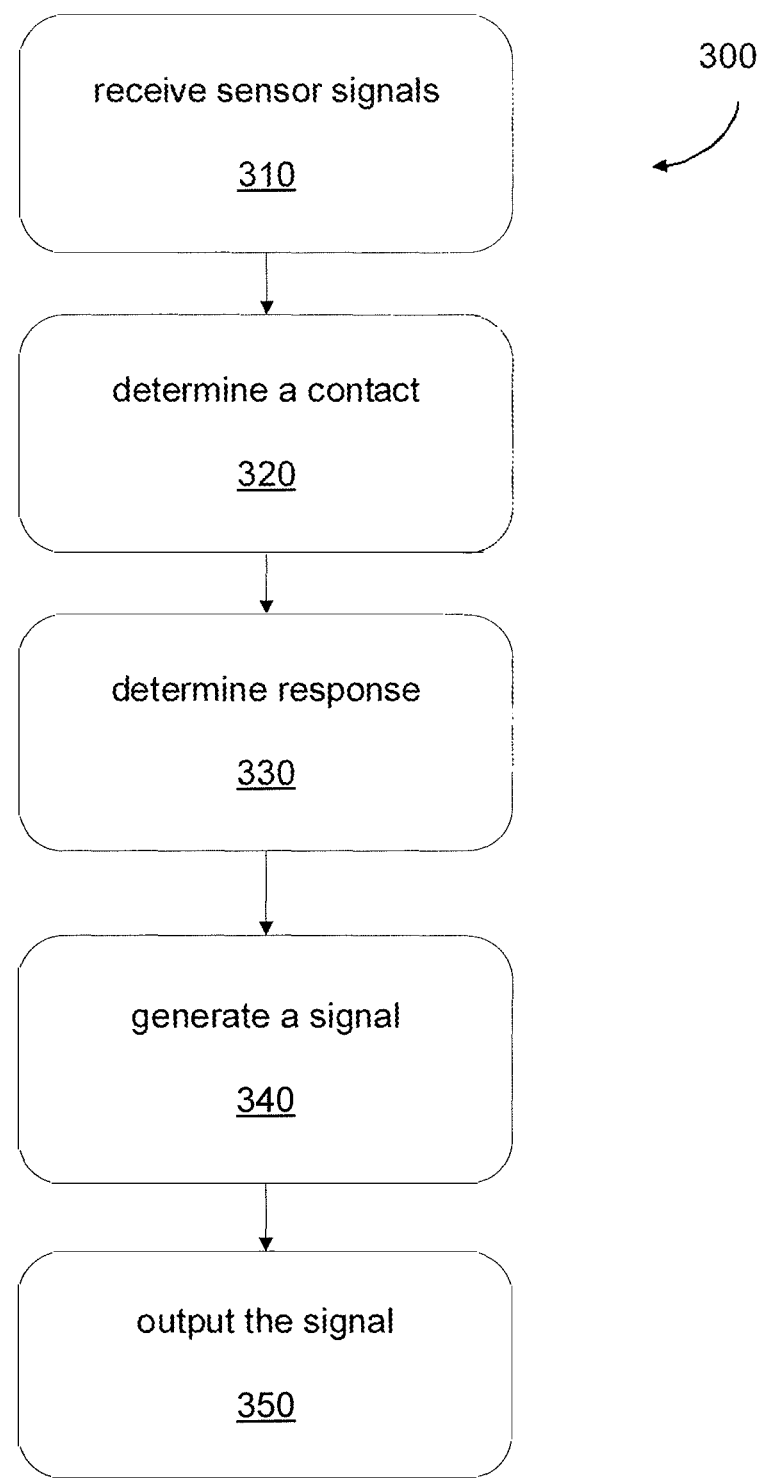
FIG. 3 illustrates a flow chart directed to a method of detecting and responding to a contact on a multi-pressure touch-sensitive input device in accordance with an embodiment of the present invention.

Referring now to FIG. 3, FIG. 3 illustrates a flow chart directed to a method 300 of detecting and responding to a contact on a multi-pressure touch-sensitive input device 100 in accordance with an embodiment of the present invention. The method shown in FIG. 3 will be described with respect to the device shown in FIG. 2.

The method 300 begins in block 310 when a sensor signal is received. For example, in one embodiment, the processor 210 receives a signal from the touch-sensitive display 230 when a user contacts the touch-sensitive display 230 and the signal includes information associated with an input on—or a status of—the touch-sensitive display 230 such as the x, y location and pressure of a contact on the touch-sensitive display 230. In other embodiments, the processor 210 receives a plurality of sensor signals. For example, the processor 210 may receive a first signal including information associated with a first input on the touch-sensitive display 230, a second signal including information associated with a second input on the touch-sensitive display 230, and a third signal including information associated with a third input on the touch-sensitive display 230. In one embodiment, the processor 210 receives a first signal including information containing the x, y location of a contact on the touch-sensitive display 230 and a second signal including information containing the pressure of the contact. In another embodiment, the processor 210 receives a first signal including information containing the x, y locations of two contacts on the touch-sensitive display 230 and a second signal includes information containing pressures of the two contacts. The processor 210 may receive a single signal that includes information associated with two or more inputs on the touch-sensitive display 230. For example, in one embodiment, the processor 210 receives a single signal that includes the x, y location and pressure of a first contact and the x, y location and pressure of a second contact.

As discussed above, in one embodiment, the processor 210 receives a signal from the touch-sensitive display 230. In some embodiments, the device 200 may comprise a touch-sensitive surface separate from, or instead of, a touch sensitive display 230. In such an embodiment, the processor 210 may receive sensor signals(s) from the touch-sensitive surface, or if a plurality of touch-sensitive surfaces are employed, from one or more of the plurality of touch sensitive surfaces.

In some embodiments, the processor 210 may receive one or more sensor signals from the network interface 250. For example, in one embodiment, the network interface 250 is in communication with and receives information from one or more components or devices, or both. In this embodiment, the network interface 250 sends one or more signals to the processor 210 that contain information from the other components or devices, or both. For example, the network interface 250 may receive a signal from another multi-pressure touch-sensitive input device and the signal may contain information regarding an input on a touch-sensitive display of the other device. The network interface 250 may send information regarding the input on the display of the other device to the processor 210. In another embodiment, the network interface 250 receives a signal from a wireless touch-sensitive surface that is in communication with the network interface 250 and the network interface 250 sends one or more signals containing information about an input on or the status of the touch-sensitive surface to the processor 210.

In other embodiments, the network interface 250 may receive a plurality of sensor signals from one or more components or devices in communication with the network interface 250 and can send one or more signals to the processor 210. For example, in one embodiment, the network interface 250 is in communication with a wireless touch-sensitive surface and another multi-pressure touch-sensitive input device. In such an embodiment, the network interface 250 may receive one signal from the wireless touch-sensitive surface and another signal from the multi-pressure touch-sensitive input device. In addition, the network interface 250 may send one or more signals containing information from the wireless touch-sensitive surface or from the other multi-pressure touch-sensitive input device, or both, to the processor 210. Thus, the processor 210 may receive one or more signals from both the touch-sensitive display 230 and the network interface 250. For example, in one embodiment, the processor 210 receives a first signal from the touch-sensitive display 230 containing information about an input on the touch-sensitive display 230 and the processor 210 receives a second signal from the network interface 250 containing information about an input on the display of another multi-pressure touch-sensitive input device that is in communication with the network interface 250.

As discussed above, in one embodiment, the processor 210 receives a signal when a user contacts the touch-sensitive display 230. In such an embodiment, the processor 210 may receive a signal from the touch-sensitive display 230 only when an input is made on the display. Or the processor 210 may receive a signal from the touch-sensitive display 230 when an input is initially made on the touch-sensitive display 230 and when a change to an existing input is made. For example, the processor 210 may receive one or more signals when a user contacts the touch-sensitive display 230 and each time the user moves the contact along the touch-sensitive display 230. In other embodiments, the processor 210 may receive successive signals from the touch-sensitive display 230 for the entire duration of one or more contacts. In one embodiment, the processor 210 receives a signal from the touch-sensitive display 230 at specified time intervals. For example, the processor 210 may receive a signal from the touch-sensitive display 230 periodically, such as every 0.1 ms. In other embodiments, the processor 210 receives a signal containing status information from the touch-sensitive display 230 regardless of whether a contact is made on the touch-sensitive display 230. For example, in one embodiment, the processor 210 receives successive signals from the touch-sensitive display 230 at a specified time intervals regardless of whether a contact is made on the touch-sensitive display 230, but if a contact exists on the touch-sensitive display 230 the signal may contain information regarding the contact such as the location and pressure of the contact.

In the embodiment discussed above, the signal that the processor 210 receives includes information associated with an input on—or a status of—the touch-sensitive display 230 such as the x, y location and pressure of a contact on the touch-sensitive display 230. In various embodiments, a signal that is received by the processor 210 can provide information relating to one or more contacts on the device 200, information relating to a component of the device 200, or information related to other components or devices that the processor 210 can use to determine a contact. For example, in one embodiment a signal contains information indicating that a contact has occurred. In another embodiment, the signal may contain the change in pressure of a contact from a previous measurement to the current measurement. Similarly, a signal may contain information regarding the change in location of a contact from a previous location. In various embodiments, a signal can contain data including, but not limited to, location data, contact data, interaction data, gesture data, duration data, pressure data, thermal data, waveform data, capacitive data, infrared data, photodetection data, optical data, other data necessary or relevant in determining a contact.

Referring again to method 300, once a sensor signal has been received the method 300 proceeds to block 320. In block 320 a contact is determined. As discussed above, in one embodiment, the processor 210 only receives a signal once a contact is made with the touch-sensitive display 230. Thus, in this embodiment, the display 230 receives a sensor signal, determines a contact, and sends a signal to the processor 210. The processor 210, on the other hand, does not have to determine a contact because the processor 210 only receives a signal from the display 230 once a contact has been determined. Thus, in some embodiments, the display 230 receives sensor signals as specified in block 310 and determines a contact as specified in block 320 and the processor determines a response as specified in block 330.

In some embodiments, the processor 210 determines whether a contact has occurred as specified in block 320. For example, a display may receive sensor signals as specified in block 310 and the display may send information associated with the sensor signals to the processor 210, either directly if the display is in communication with the processor 210 or through the network interface 250, which the processor 210 receives and uses to determine whether a contact has occurred as specified in block 320. In one embodiment, the information that the processor 210 receives comprises an instruction specifying that a contact has occurred. In another embodiment, the information that the processor 210 receives is indicative of whether a contact has occurred. For example, if the processor 210 receives information containing an x coordinate, a y coordinate, and a pressure, the processor 210 may be able to use this information to determine that a contact has occurred. In another embodiment, the processor 210 receives pressure information at periodic intervals that the processor 210 uses to determine whether a contact has occurred based upon changes in the pressure information. In other embodiments, if the pressure information the processor 210 receives is less than a threshold pressure the processor 210 may determine that a contact has not occurred and if the pressure is greater than or equal to the threshold pressure the processor 210 may determine that a contact has occurred.

As discussed previously, a contact with the device 200 can be made in numerous ways. For example, a contact can be made with the touch-sensitive display 230 by one or more objects such as, for example, a single finger, multiple fingers, or a pencil. In one embodiment, a contact may include physically contacting the touch-sensitive display 230 and, in another embodiment, a contact may include hovering an object over the touch-sensitive display 230 without physically contacting the touch-sensitive display 230. Thus, in some embodiments the processor 210 can determine a contact based on a physical contact with the touch-sensitive display 230 and, in other embodiments, the processor 210 may determine a contact based on a near-contact with or object hovering over the touch-sensitive display 230.

The device 200 may use various technologies to determine whether a contact has occurred or to obtain information related to a contact. For example, temperatures on or near the touch-sensitive display 230 may be measured to determine whether a contact has occurred. Thus, a finger approaching the touch-sensitive display 230 may be detected and a contact determined based at least in part on the difference in the ambient temperature surrounding the device 200 and the temperature of the approaching finger. In one embodiment, the device 200 comprises one or more capacitive sensors that are used to detect a contact based on an object approaching the touch-sensitive display 230. The device 200 may comprise other components including, but not limited to, an infrared LED, a photodetector, an image sensor, an optical camera, or a combination thereof that may be used to determine, at least in part, whether a contact on the touch-sensitive display 230 has occurred or to obtain information related to a contact. Thus, the device 200 may use any suitable technology that allows the touch-sensitive display 230 to determine, or assists the processor 210 in determining, a contact on the touch-sensitive display 230.

In some embodiments, the device may receive information from the network interface 250 which the processor 210 uses to determine whether a contact has occurred as shown in block 320. For example, the processor 210 may receive information from the network interface 250 that is in communication with another device. In one embodiment, the other device may send the network interface 250 information when a display associated with the other device receives an input and the processor 210 may receive information from the network interface 250 related to the input on the other device. In some embodiments, the processor 210 may receive periodic information from the network interface 250 about another device that is in communication with the network interface. In one embodiment where the network interface 250 is in communication with a remote touch-sensitive surface, the network interface 250 receives information from the touch-sensitive surface and sends information to the processor 210 which the processor 210 uses to determine a contact. In still further embodiments, another component, such as a separate microprocessor or co-processor may be responsible for determining a contact and providing such information to the processor 210. In various embodiments, software stored on the memory 220 and executed by the processor 210 may also be used in determining whether a contact has occurred, such as by implementing various techniques discussed above.

Referring again to method 300, once a contact has been determined 320, the method 300 proceeds to block 330. In block 330 a response is determined. As discussed above, in one embodiment, the processor 210 receives a signal from the touch-sensitive display 230 when a user contacts the touch-sensitive display 230 and the signal includes the x, y location and pressure of the contact on the touch-sensitive display 230. In this embodiment, if the user is viewing a web page displayed on the touch-sensitive display 230 of the device 200 and if the processor 210 determines that the user is touching the touch-sensitive display 230 substantially simultaneously with two fingers and two contacts are determined, and it is determined that the user is applying more pressure with a finger located nearer the bottom of the screen than the other finger, the processor 210 determines that the response should be to update the touch-sensitive display 230 to scroll down the web page and to output a haptic effect that indicates that the page is scrolling down the web page. Alternatively, in this embodiment, the processor 210 may determine that the response should be to update the touch-sensitive display 230 to scroll up the web page and to output a haptic effect that indicates that the page is scrolling up the web page, such as if the processor 210 detects two substantially-simultaneous contacts on the touch-sensitive display 230 and the pressure of the contact located nearer the top of the screen is larger than the pressure of the contact located nearer the bottom of the screen.

In some embodiments, the rate or speed of scrolling is based at least in part on the pressures. For example, the scrolling rate may increase as the difference in pressures between two contacts increases. In one embodiment, one or more haptic effects are output corresponding to the rate of scrolling, such as by vibrating a device at frequencies or magnitudes that vary based on the rate of scrolling. Thus, in some embodiments, the processor 210 determines a response, if any, as specified in block 330. In other embodiments, the touch-sensitive display 230 determines a response, if any. In still further embodiments, another component, such as a separate microprocessor or co-processor in communication with the processor 210, the touch-sensitive display 230, or the network interface 250 may be responsible for determining a response and providing such information to the processor 210 or the network interface 250. In various embodiments, software stored on the memory 220 and executed by the processor 210 may also be used in determining whether a contact has occurred.

The processor 210, touch-sensitive display 230, or other component may use any or all of the information received to determine a contact in determining a response. Thus, in embodiments, components of the device 200 or components in communication with the device 200 or components of another device in communication with the device 200 may use various data including, but not limited to, location data, contact data, interaction data, gesture data, duration data, pressure data, thermal data, waveform data, capacitive data, infrared data, photodetection data, optical data, other data necessary or relevant in determining a response. For example, in one embodiment, pressure data for two contacts is used by the processor 210 to determine a response. In another embodiment, the touch-sensitive display 230 may compare the pressure of a contact against a threshold pressure to determine a response. In other embodiments, information regarding one or more contacts is sent by the device 200 through the network interface 250 to another device that determines a response, if any, and sends information regarding any response back to the device 200.

The processor 210, touch-sensitive display 230, or other component may use the information received in any number of ways to determine whether a response is needed and, if so, what the response should be. For example, in one embodiment, the processor 210 may determine that an image associated with the touch-sensitive display 230 should be moved. In another embodiment, the touch-sensitive display 230 may determine that the color of an object on the touch-sensitive display 230 should be changed. In other embodiments, the processor 210 may determine that one or more actuators need to output one or more haptic effects. Various additional responses are discussed below.

In some embodiments, duration data may be received by the processor 210, the touch-sensitive display 230, or the network interface 250 may be used to determine a response, if any. For example, in one embodiment, the processor 210 may determine a particular response if the length of time that a contact has contacted the touch-sensitive display 230 exceeds a threshold duration. In other embodiments, a response may be determined if the duration of a contact is below a threshold duration. The processor 210 may determine a response based upon the duration of time of two or more contacts with the touch-sensitive display 230. For example, in one embodiment, if the duration of a first contact exceeds the duration of a second contact, the processor 210 may determine a response. In other embodiments, a response may be determined if a second contact occurs within a predetermined time after a first contact with the touch-sensitive display 230. For example, in one embodiment, a second contact must be substantially simultaneous with a first contact for the processor 210 to determine a response.

Figure 4:
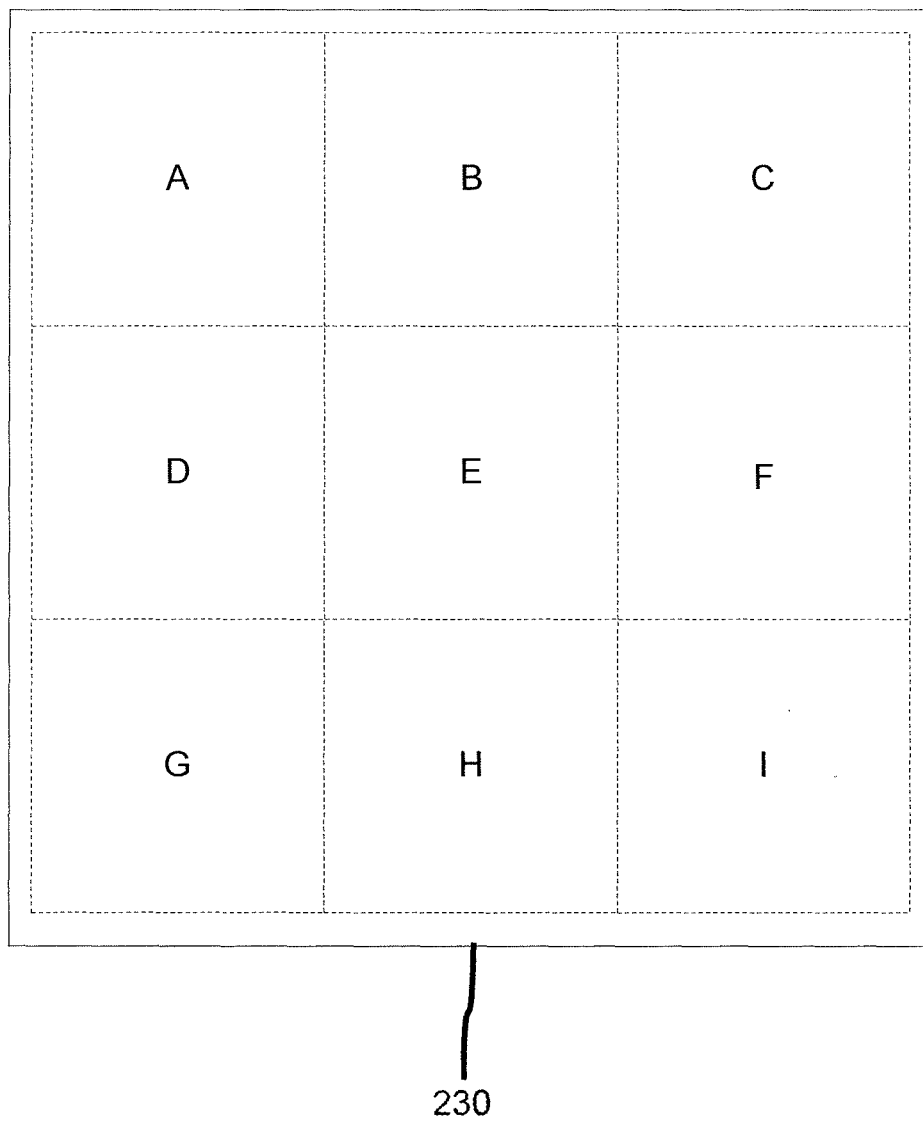
FIG. 4 illustrates an operation of a multi-pressure touch-sensitive input device in accordance with an embodiment of the present invention.

In some embodiments, location data may be received by the processor 210, the touch-sensitive display 230, or the network interface 250 may be used to determine a response, if any. The location of a contact may be determined in any number of ways. For example, the touch-sensitive display 230 may be addressable using Cartesian x and y coordinates or polar coordinates. Thus, in one embodiment, if the location of a first contact has an x coordinate that is larger than the x coordinate of the second location of a second contact, then the device 200 may determine that the first location is greater than the second location. In another embodiment, if the location of a first contact has a y coordinate larger than the y coordinate of the second location of a second contact, then the device 200 may determine that the first location is greater than the second location. Still in other embodiments, a formula based on the x and y coordinates of each contact may be used to determine the device's 200 response, if any. For example, in one embodiment the formula $sqrt(x^2+y^2)$ may be used to determine whether a contact is within a particular area or distance from a specified location on the touch-sensitive display 230. In another embodiment, the formula $x+2y$ may be used to determine whether a contact is within a rectangle from a specified coordinate on the touch-sensitive display 230. In one embodiment, the device 200 may determine the location of a contact by logically dividing the touch-sensitive display 230 into sections. For example, the device 200 may logically divide a rectangular touch-sensitive display 230 into three rows and three columns, thus, creating nine contact cells as shown in FIG. 4 as will be discussed in more detail below.

Referring again to FIG. 4, a contact in section "B" and a substantially-simultaneous contact in section "F" on the touch-sensitive display 230 may cause the device 200 to determine that a response to the detected contacts is to scroll a page displayed on the touch-sensitive display 230 in a northeastern direction. Similarly, a contact in section "B" and a contact in section "D" may cause the device 200 to determine that a response to the detected contacts is to scroll a page displayed on the touch-sensitive display 230 in a northwestern direction. In one embodiment, the speed at which a page is scrolled on the touch-sensitive display 230 is based on the pressure of one or more of the contacts or a difference in pressure between multiple contacts. The device 200 may determine that one or more haptic effects should be to alert a user that an interaction has been detected, that a response is occurring, or that a response has been completed such as that the page is scrolling. In one embodiment, the haptic effect may vary depending on the direction in which the page is scrolling.

For example, the processor 210 may determine that a haptic effect should be output each time a contact is made with the touch-sensitive display 230. Thus, as a user contacts sections "B" and "F," the processor 210 determines a haptic effect should be output in response to each contact. Further, once the contacts are recognized as a gesture, such as a scroll gesture, the processor 210 may determine a haptic effect associated with the gesture.

In another embodiment, the processor 210 may determine that a response to a detected contact or sequence of contacts is to update an image displayed on the touch-sensitive display 230 and to output a haptic effect. For example, a response may be that an image displayed on the touch-sensitive display 230 is moved. In one embodiment, a response may be that an image displayed on the touch-sensitive display 230 is rotated. For example, referring again to FIG. 4, if sections "B", "D", and "F" are contacted substantially simultaneously and then released, and then sections "B", "D", and "H" are contacted within a predetermined period of time, then an image displayed on the touch-sensitive display 230 may be rotated in a counter-clockwise direction. Similarly, if sections "B", "D", and "F" are contacted substantially simultaneously and then released, and then sections "B", "H", and "F" are contacted within a predetermined period of time, such as 0.1 ms or 0.25 ms or 0.5 ms, then an image displayed on the touch-sensitive display 230 may be rotated in a clockwise direction. In some embodiments, a response may be that at least one haptic effect is output to indicate that the image is being rotated in a clockwise or counter-clockwise direction on the touch-sensitive display 230. For example, in one embodiment, the processor 210 may determine a haptic effect associated with a rotation of the image, such as a vibration that may be perceived to travel in the direction of rotation or may increase in intensity or frequency the farther the image is rotated. Alternatively, the processor 210 may identify a non-directional vibration effect that varies in frequency based on the direction of rotation. For example, in one embodiment, the frequency of the vibration may increase if the image is rotated in a clockwise direction or decrease if the image is rotated in a counterclockwise direction. Further, the processor may determine a haptic effect, such as a pop or jolt, to be output in response to a rotation of the image back to its starting orientation.

In one embodiment, a response may be that the graphics displayed on the touch-sensitive display 230 are zoomed in or out. For example, referring still to FIG. 4, if sections "A", "C", "G", and "I" are contacted substantially simultaneously then the graphics displayed on the touch-sensitive display 230 may be zoomed out. Similarly, if sections "B", "D", "F", and "H" are contacted substantially simultaneously then the graphics displayed on the touch-sensitive display 230 may be zoomed in. In some embodiments, the processor 210 may determine that a response is that one or more sounds needs to be output and can output the necessary signals to the speaker 270. In other embodiments, a response may be that at least one haptic effect may be output to indicate that the graphics displayed on the touch-sensitive display 230 are being zoomed out or zoomed in. For example, in one embodiment, the processor 210 may determine a haptic effect associated with a level of zoom of the image, such as a vibration that may increase in intensity or frequency the greater the zoom, or may decrease in frequency or intensity the lower the zoom level. Further, the processor 210 may determine a haptic effect, such as a pop or jolt, to be output in response to a rotation of the image back to its starting orientation.

In other embodiments, a response may be determined based on a change in location of one or more contacts on the touch-sensitive display 230. For example, the processor 210 may determine a response based on the location of a first contact changing in a northern direction and the location of a second contact changing in an eastern direction. In another embodiment, the processor 210 may determine a response based on the location of a first contact moving in a western direction and a second contact moving in an eastern direction. In other embodiments, the processor 210 can determine a response based on whether the location of a first contact is moving in an opposite direction of the location of a second contact on the touch-sensitive display 230.

In some embodiments, a response may be determined based on a specified interaction with the device 200. An interaction can include any number of actions based on one or more contacts. For example, in one embodiment, the processor 210 may determine a response based on an interaction where the interaction having a first contact having a location corresponding with a graphical object on the touch-sensitive display 230 and a second contact having a location not corresponding with the graphical object on the touch-sensitive display 230. In other embodiments, an interaction may be based two contacts having a location corresponding with a graphical object on the touch-sensitive display 230. In various embodiments, an interaction may be based on two graphical objects on the touch-sensitive display 230 where the location of a first contact corresponds with the first graphical object and the location of a second contact corresponds with the second graphical object.

In other embodiments, the processor 210 can determine a response to a contact on the touch-sensitive display 230 based on a combination of the various data the processor 210 receives from the touch-sensitive display 230 or the network interface 250 or one or more of the factors such as a change in location or an interaction. For example, in one embodiment, a response can be determined by the processor 210 based on both pressure and location of one or more contacts on the touch-sensitive display 230. In another embodiment, the processor 210 can determine a response based on pressure and an interaction. For example, the processor 210 may determine that the color of a graphical displayed on the touch-sensitive display 230 needs to be changed based upon a first contact having a location corresponding to the graphical object and a second contact not having a location corresponding to the graphical object and the first contact having a specified pressure. Other embodiments are described herein and still other embodiments would be apparent to one of skill in the art.

Referring again to the embodiment shown in FIG. 3, once a response is determined as specified in block 330, the processor 210 generates a signal as specified in block 340. For example, in one embodiment discussed above, the processor 210 receives a signal from the touch-sensitive display 230 when a user contacts the touch-sensitive display 230 and the signal includes information associated with an input on—or a status of—the touch-sensitive display 230 such as the x, y location and pressure of a contact on the touch-sensitive display 230. In this embodiment, if the user is viewing a web page displayed on the touch-sensitive display 230 of the device 200 and if the processor 210 determines that the user is touching the touch-sensitive display 230 substantially simultaneously with two fingers (i.e. two contacts) and is applying more pressure with a finger located nearer the bottom of the screen than the other finger, the processor 210 determines that the response should be to update the touch-sensitive display 230 to scroll down the web page and to output a haptic effect that indicates that the page is scrolling down the web page. In this embodiment, the processor 210 generates a first signal that is configured to cause the touch-sensitive display 230 to scroll down the web page and the processor 210 generates a second signal that is configured to cause actuator 240 to output a haptic effect that indicates that the page is scrolling down the page.

In some embodiments, the processor 210 generates a single signal after determining a response. For example, if the processor 210 determines that the touch-sensitive display 230 needs to be updated, then the processor 210 can generate a display signal and send the signal to the touch-sensitive display 230 that causes the graphics associated with the touch-sensitive display 230 to be updated. In other embodiments, the processor 210 generates two, three, or more signals. For example, in one embodiment, the processor 210 generates a different signal for each response that is determined in block 330 of the method 300 shown in FIG. 3. Thus, if it is determined that the touch-sensitive display 230 needs to be updated, actuator 240 needs to output a first haptic effect, and actuator 260 needs to output a second haptic effect, then the processor 210 may generate a first signal configured to cause the touch-sensitive display 230 to be updated, a second signal con figured to cause actuator 240 to output a haptic effect, and a third signal configured to cause actuator 260 to output a haptic effect. In other embodiments, the processor 210 may generate one or more signals configured to cause the touch-sensitive display 230, the network interface 250, the actuator 240, the actuator 260, the speaker 270, other components of the device 200, other components or devices in communication with the device 200, or a combination thereof to perform a particular function.

In one embodiment, a generated signal includes a command for a device or component to perform a specified function, such as to output a haptic effect, display an image, play a sound, or transmit a message to a remote device. In another embodiment, a generated signal includes parameters which are used by a device or component receiving the command to determine a response or some aspect of a response. Parameters may include various data related to, for example, magnitudes, frequencies, durations, or other parameters that an actuator can use to determine a haptic effect, output a haptic effect, or both. For example, in one embodiment, the processor 210 generates a signal configured to cause actuator 240 to output a haptic effect. In such an embodiment, the signal may include a pressure parameter that the actuator 240 uses to the intensity of the haptic effect to output. For example, according to one embodiment, the larger the pressure parameter the actuator 240 receives, the more intense the haptic effect that is output. Thus, a signal may include data that is configured to be processed by an actuator, display, network interface, speaker, or other component of a device or in communication with a device in order to determine an aspect of a particular response.

Referring again to FIG. 3, once a signal has been generated as specified in block 340, the next step of method 300 is to output the signal as shown in block 350. For example, in one embodiment discussed above, the processor 210 generated a first signal configured to cause the touch-sensitive display 230 to scroll down the web page and the processor 210 generated a second signal configured to cause actuator 240 to output a haptic effect that indicates that the page is scrolling down the page. In such an embodiment, the processor 210 outputs the first signal to the touch-sensitive display 230 and outputs the second signal to actuator 240.

In various embodiments, the processor 210 may output one or more generated signals to any number of devices. For example, the processor 210 may output one signal to the network interface 250. In one embodiment, the processor 210 may output one generated signal to the touch-sensitive display 230, another generated signal to the network interface 250, and another generated signal to the actuator 260. In other embodiments, the processor 210 may output a single generated signal to multiple components or devices. For example, in one embodiment, the processor 210 outputs one generated signal to both actuator 240 and actuator 260. In another embodiment, the processor 210 outputs one generated signal to actuator 240, actuator 260, and network interface 250. In still another embodiment, the processor 210 outputs one generated signal to both actuator 240 and actuator 260 and outputs a second generated signal to the touch-sensitive display 230.

As discussed above, the processor 210 may output one or more signals to the network interface 250. For example, the processor 210 may output a signal to the network interface 250 instructing the network interface 250 to send data to a another component or device in communication with the device 200. In such an embodiment, the network interface 250 may send data to the other device and the other device may perform a function such as updating a display associated with the other device or the other device may output a haptic effect. Thus, in embodiments of the present invention, a second device may output a haptic effect based at least in part upon an interaction with a first device in communication with the second device. In other embodiments, a second device may perform any number of functions such as, for example, updating a display associated with the second device or outputting a sound to a speaker associated with the second device based at least in part on an interaction with a first multi-pressure touch-sensitive input device 200.

In various embodiments, after the processor 210 outputs a signal to a component, the component may send the processor 210 a confirmation indicating that the component received the signal. For example, in one embodiment, actuator 260 may receive a command from the processor 210 to output a haptic effect. Once actuator 260 receives the command, the actuator 260 may send a confirmation response to the processor 210 that the command was received by the actuator 260. In another embodiment, the processor 210 may receive completion data indicating that a component not only received an instruction but that the component has performed a response. For example, in one embodiment, actuator 240 may receive various parameters from the processor 210. Based on these parameters actuator 240 may output a haptic effect and send the processor 210 completion data indicating that actuator 240 received the parameters and outputted a haptic effect.

Another embodiment of the present invention that implements the method 300 shown in FIG. 3 and that will be described with respect to the device shown in FIG. 2 is a paint mixing application. In this embodiment, a user contacts the touch-sensitive display 230 with one finger to select a first color and contacts the touch-sensitive display 230 with a second finger to select a second color. In this embodiment, the touch-sensitive display 230 shows a third color that represents the first color being mixed with the second color. For example, if the first color is red and the second color is yellow, then the third color shown on the touch-sensitive display 230 may be orange. In some embodiments, the shade of the third color may be changed by increasing or decreasing the pressure of the contact of either the first or second finger. Thus, the amount of the first color shown in the third mixed color is a function of the pressure of the first contact. Likewise, the amount of the second color shown in the third mixed color is a function of the pressure of the second contact. Thus, the third mixed color that is shown on the touch-sensitive display 230 is a function of the first color, the first pressure, the second color, and the second pressure, thereby providing an intuitive mechanism for generating a new color to be used. In various embodiments, one or more haptic effects are output based at least in part on an applied pressure of at least one contact.

An embodiment of a sculpting application that implements the method 300 shown in FIG. 3 is described below with respect to the device shown in FIG. 2. In one embodiment, a piece of clay is displayed on the touch-sensitive display 230. A user can interact with and shape the clay by contacting the touch-sensitive display 230. For example, if a user contacts the touch-sensitive display 230 with three fingers, each corresponding with a different location on the clay, then the touch-sensitive display 230 is updated to show the clay with a deformation at each location. The user may further be able to perform multi-touch, multi-pressure gestures to further shape the clay in a fashion similar to how actual clay may be manipulated. Thus, a user is able to shape and form the clay on the touch-sensitive display 230. In some embodiments, the rate of deformation of a contact may be a function of the pressure or movement speed that a user is applying with each finger. In various embodiments, one or more haptic effects are output based at least in part on applied pressure of a contact.

One embodiment of the present invention is directed to a texture-based application that implements the method 300 shown in FIG. 3. This embodiment will be described with respect to the device shown in FIG. 2. In this embodiment, an image representing one or more textures is displayed on the touch-sensitive display 230. A user can contact the touch-sensitive display with one or more fingers and drag one or more fingers across the image which represents a texture and, in response, one or more haptic effects may be output. For example, in one embodiment, an image of a piece of sandpaper is displayed on the touch-sensitive display 230. In this embodiment, a user can contact the touch-sensitive display 230 with a finger and move the finger along portions of the display 230 where the image of the piece of sandpaper is located. In response, one or more haptic effects may be output that indicate the texture of the image such that the haptic effects simulate the feeling of actually rubbing a finger along a piece of sandpaper. In some embodiments, haptic effects may be output that are based on the pressure of each contact. Thus, if a user increases the pressure of a contact on the touch-sensitive display 230 then the magnitude of one or more haptic effects may be increased as well or a friction between the user's fingers and the touch-sensitive surface may be increased, such as by changing a shape of the touch-sensitive surface or by raising features on the touch-sensitive surface. Therefore, in embodiments, one or more haptic effects that simulate the texture of one or more objects displayed on the touch-sensitive display 230 may be output in response to multi-touch, multi-pressure contacts or gestures.

In a further embodiment, an image of a keyboard is displayed on the touch-sensitive display 230. A user can interact with the device by contacting the touch-sensitive display 230 at locations which correspond to keys on the keyboard. In some embodiments, a user may use multiple fingers to type on the keyboard. In this embodiment, a haptic effect may be output based on the pressure of one or more contacts. For example, in one embodiment, the magnitude of a haptic effect is a function of the pressure in which a user contacts the touch-sensitive display 230. Thus, the harder (i.e. more pressure) that a user contacts the touch-sensitive display 230, the stronger the haptic effect.

While the steps of method 300 have been shown and described in a particular order, other embodiments of the present invention may comprise the same or additional steps or may perform the steps shown in FIG. 3 in a different order or in parallel. For example, the method may receive a plurality of sensor signals and determine a plurality of contacts substantially simultaneously or in succession prior to determining a response.

Illustrative Method of Detecting and Responding to a Contact

Figure 5:
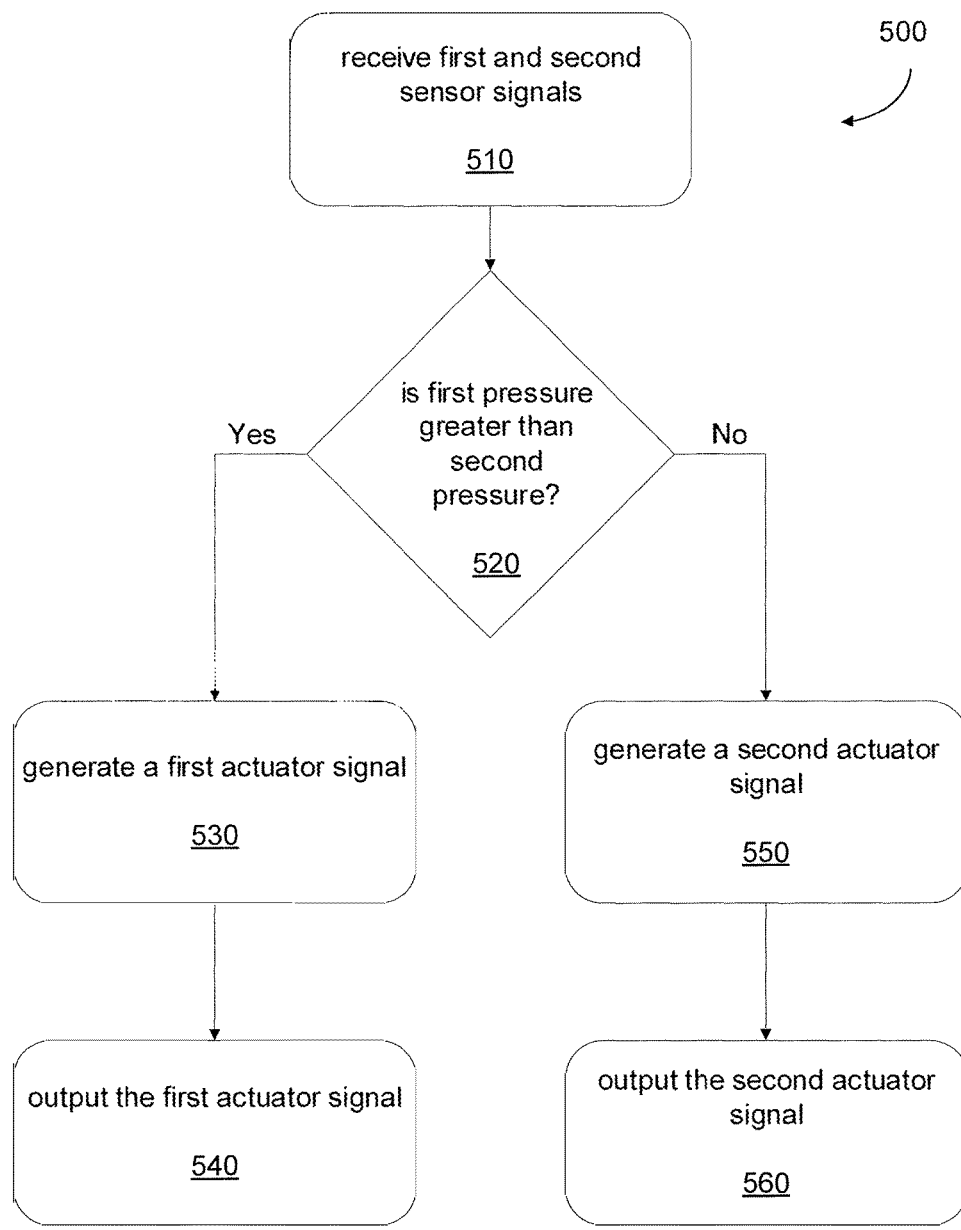
FIG. 5 illustrates a flow chart directed to a method of detecting and responding to a contact on an multi-pressure touch-sensitive input device in accordance with an embodiment of the present invention.

Referring now to FIG. 5, FIG. 5 illustrates a flow chart directed to a method 500 of outputting an actuator signal in an multi-pressure touch-sensitive input device in accordance with an embodiment of the present invention. The description of the method 500 of FIG. 5 will be made with respect to the device 200 shown in FIG. 2 and the example shown in FIG. 6.

Figure 6A:
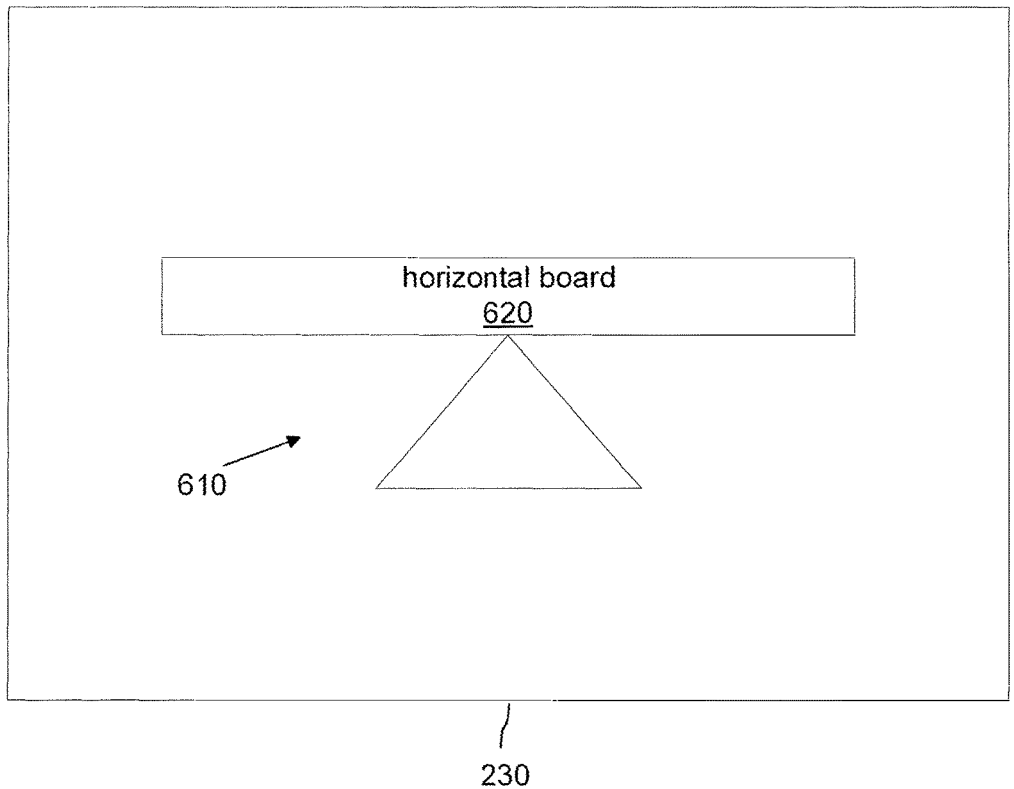
FIGS. 6A-6C illustrate the operation of a multi-pressure touch-sensitive input device in accordance with an embodiment of the present invention.
Figure 6B:
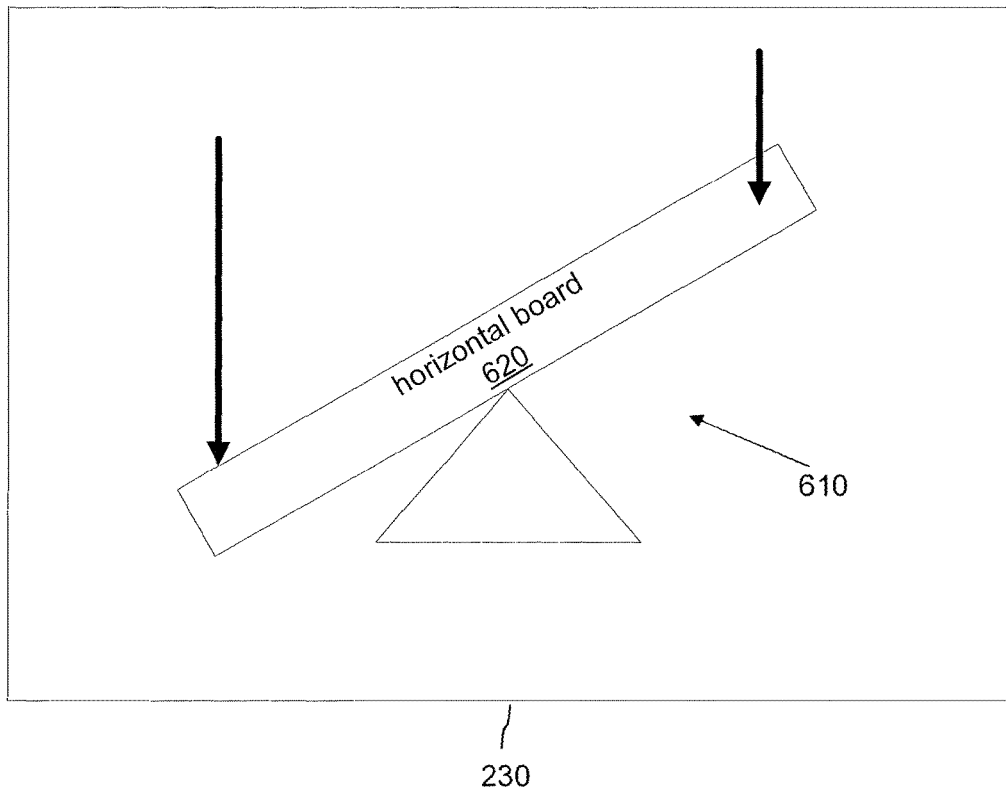
Figure 6C:
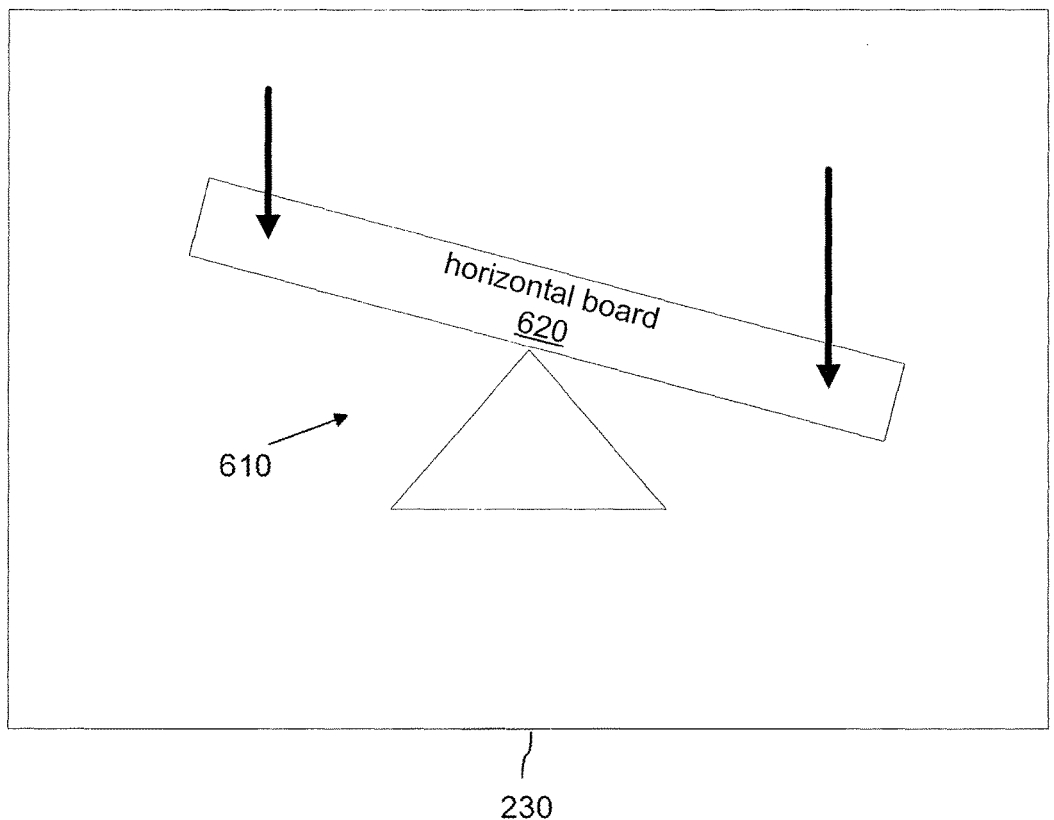

FIGS. 6A-6C illustrate the operation of a multi-pressure touch-sensitive input device 200 in accordance with an embodiment of the present invention. Embodiments of the present invention may allow a user to interact with an object using multi-contact, multi-pressure inputs. In some embodiments, an object may be a graphical user object, such as a button, a scroll bar, a radio button, etc. In some embodiments, an object may be any graphical object or textual object displayed on a screen. For example, in FIG. 6A, a graphical object is a seesaw 610 having a horizontal board 620 is displayed on the touch-sensitive display 230 of a multi-pressure touch-sensitive input device 200. A user interacts with the seesaw 610 by contacting the touch-sensitive display 230 at various locations and with various pressures.

The method 500 shown in FIG. 5 begins in block 510 when the processor 210 receives first and second sensor signals. For example, as a user interacts with the device 200, the processor 210 is provided with information, such as a first pressure, related to a first contact if the user contacts a location on the touch-sensitive display 230 associated with the left side of the seesaw 610. In addition, as the user interacts with the device 200, the processor 210 is provided with information, such as a second pressure, related to a second contact if the user contacts a location on the touch-sensitive display 230 associated with the right side of the seesaw 610. After receiving the sensor signals, the method 500 proceeds to block 520.

In block 520, the processor 210 determines whether the pressure of the first contact is greater than the pressure of the second contact 520. If the pressure of the first contact is greater than the pressure of the second contact, the method 500 proceeds to block 530, otherwise it proceeds to block 550.

In block 530, the processor 210 generates a first actuator signal. In the embodiment shown in FIG. 6, the first actuator signal is configured to cause actuator 240 to output a haptic effect that simulates the left side of the board 620 being moved down because the first pressure is greater than the second pressure. The generated signal can comprise some or all of the data, instructions, or parameters discussed above with respect to the embodiment shown in FIG. 3. For example, in one embodiment, the generated signal includes a parameter that the first actuator uses to determine the intensity of the haptic effect based on the greater pressure. In another embodiment, the generated actuator signal may include a parameter based on the difference in pressures between a contact on the left side of the seesaw 620 and a contact on the right side of the seesaw 620. In still other embodiments, the generated actuator signal may include information related to how close the left side of the seesaw 620 is to the ground. In the embodiment shown in FIG. 6, the processor 210 generates another signal configured to cause the touch-sensitive display 230 to update the image on the display as shown in FIG. 6B.

Once the processor 210 generates the first actuator signal as shown in block 530, the processor 210 outputs the first actuator signal as shown in block 540. For example, in the embodiment shown in FIG. 6, the processor 210 outputs the actuator signal to actuator 240. In response to receiving the signal from the processor 210, the actuator 240 outputs the desired haptic effect. In the embodiment shown in FIG. 6, the processor 210 also outputs another signal which causes the display to be updated as shown in FIG. 6B.

In block 550, the processor 210 generates a second actuator signal and outputs the second actuator signal 560 to actuator 260. In this embodiment, the second actuator signal includes a magnitude parameter that actuator 260 uses to determine the desired haptic effect and actuator 260 outputs the haptic effect. For example, in the embodiment shown in FIG. 6, if the first pressure is not greater than the second pressure, then the processor 210 generates a second actuator signal configured to cause actuator 240 to output a haptic effect that simulates the right side of the board 620 being moved down because the first pressure is not greater than the second pressure. In addition, in this embodiment, the processor 210 generates another signal configured to cause the touch-sensitive display 230 to update the image on the display as shown in FIG. 6C. After the processor 210 generates the second actuator signal and the other signal, the processor 210 outputs the second actuator signal to the actuator 260 and outputs the other signal to the touch-sensitive display 230. In response, the actuator 260 outputs the desired haptic effect and the display updates the display as shown in FIG. 6C.

Thus, in the embodiment shown in FIG. 6, the pressure of the contacts on each side of the board 620 may be correlated to forces being applied to each side of the board 620. If the pressure, i.e. a simulated force in this embodiment, is greater on one side of the board 620 than on the other side of the board 620, then the touch-sensitive display 230 updates to indicate that the board 620 tilts in favor of the side under the greater simulated force and an actuator outputs a haptic effect indicating the board 620 is tilting in a corresponding direction. In one embodiment, the degree to which the side with the greater simulated force tilts depends upon the difference in pressures of the contacts. Thus, the board 620 of the seesaw 610 is not tilted as much in FIG. 6C as it is in FIG. 6B because the difference in pressures is not as large in FIG. 6C as it is in FIG. 6B. Furthermore, in such an embodiment, the haptic effect output in FIG. 6B may be more intense than the haptic effect output in FIG. 6C because the difference in pressures is not as large in FIG. 6C as it is in FIG. 6B.

Another embodiment of the present invention that implements the method 500 shown in FIG. 5 and that will be described with respect to the device shown in FIG. 2 is a snowboarding application. In this embodiment, a user can interact with the device 200 by contacting the touch-sensitive display 230 with two fingers. The pressure of a contact may be used to steer the snowboarder. For example, if the snowboarder is initially shown in the middle of the touch-sensitive display 230 when the user's finger on the left side of the screen increases its contact pressure, the snowboarder moves to the left. Or the snowboarder may move to the right if the pressure of a contact on the right side of the screen is increases or is greater than the pressure of a contact on the left side of the screen.

In some embodiments, the pressure of one or more contacts may be used to determine the rate of turning. For example, in one embodiment an increase in pressure of a contact results in an increased rate of turning. In other embodiments, the pressure of one or more contacts is used to determine both direction and rate of turning. For example, in an embodiment, the pressure of one contact determines the direction of the snowboarder (i.e. left or right) and a pressure of another contact determines the rate of turning. In this embodiment, the direction of the snowboarder may be a function of a threshold pressure. Thus, if the pressure of the contact associated with the direction of the snowboarder is greater than the threshold pressure, the snowboarder may move to the right. If the pressure of the contact associated with the direction of the snowboarder is less than the threshold pressure, the snowboarder may move to the left. Furthermore, in this embodiment, the rate of turning may be a function of the pressure. Thus, an increase in pressure of the contact associated with the rate of turning may result in an increase in the rate of turning of the snowboarder. Likewise, a decrease in pressure of the contact associated with the rate of turning may result in a decrease in the rate of turning of the snowboarder.

In embodiments, one or more haptic effects may also be output based at least in part on the pressure of one or more of the contacts to indicate to the user the direction or the rate of turning, or both. For example, in one embodiment, a haptic effect may be output that indicates that the snowboarder is moving to the left and another haptic effect may be output that indicates that the snowboarder is moving to the right. For example, a vibration may be output on a right side of the device, or a vibration may be output on a left side of the device and move to the right side of the device at a rate corresponding to the rate of the snowboarder's turning. In another embodiment, a haptic effect may be output that indicates that the rate of turning of the snowboarder is increasing and another haptic effect may be output that indicates that the rate of turning of the snowboarder is decreasing, such as by increasing or decreasing a frequency or magnitude of a vibration.

Illustrative Method of Detecting and Responding to a Contact

Figure 7:
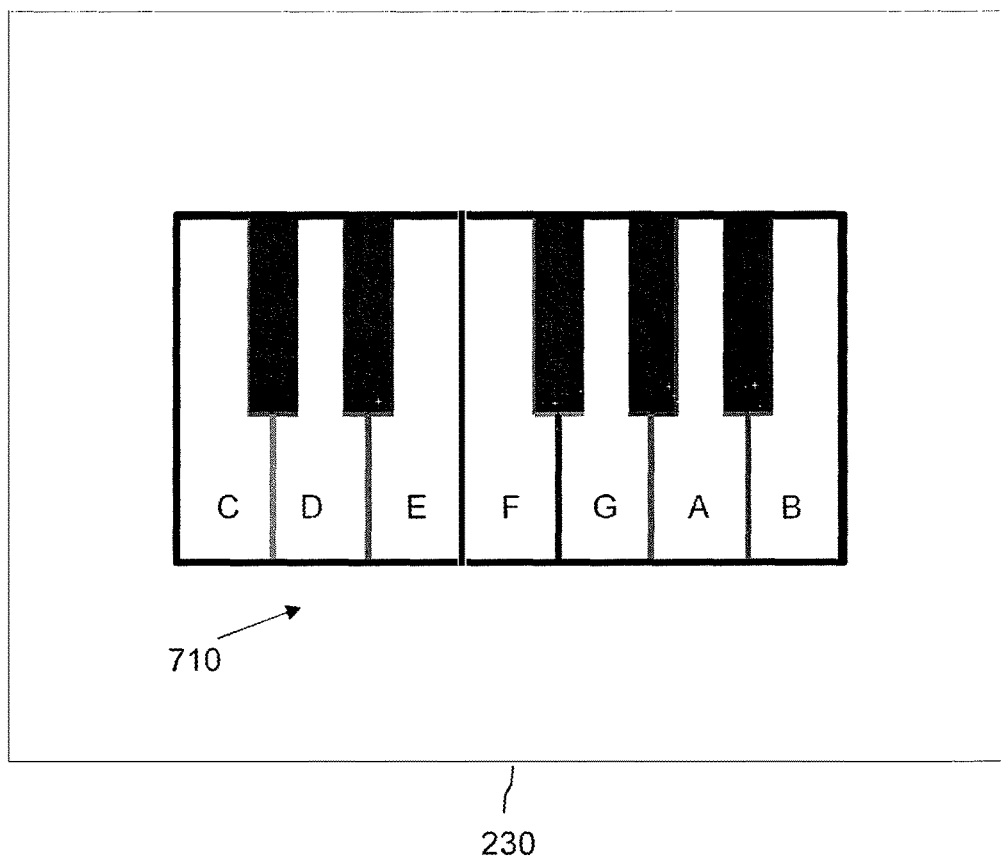
FIG. 7 illustrates an operation of a multi-pressure touch-sensitive input device in accordance with an embodiment of the present invention.

Referring now to FIG. 7, FIG. 7 illustrates the operation of a multi-pressure touch-sensitive input device 200 as shown in FIG. 2 in accordance with an embodiment of the present invention. With respect to the embodiment shown in FIG. 7, the method of FIG. 5 may be employed to provide haptic feedback as a user plays a virtual keyboard 710. In the embodiment shown in FIG. 7, the keys of a piano are displayed on a touch-sensitive display 230. In response to a user touching a location of the touch-sensitive display 230 corresponding with the "C" note of the keyboard, the device 200 outputs a sound having a frequency corresponding with the "C" note by generating an audio signal and transmitting the audio signal the speaker 270. Likewise, in response to a user touching locations on the touch-sensitive display 230 corresponding with notes "C", "E", and "G" substantially simultaneously, the device 200 outputs a sound having a frequency corresponding with the "C-E-G" chord by generating a different audio signal and transmitting it to the speaker 270.

In another embodiment, a user may touch locations on the touch-sensitive display 230 with one hand corresponding with notes "C", "E", and "G" and substantially simultaneously the user may touch locations on the touch-sensitive display 230 with another hand corresponding with notes "D", "F", and "A". In response, the device 200 may output a sound having a frequency corresponding with the "C-E-G" chord and a sound having a frequency corresponding with the "D-F-A" chord. In some embodiments, the device 200 may output one or more haptic effects to alert the user that a particular chord or combination of chords, or both, is being pressed by the user. For example, one or more haptic effects may be output that indicate which chord is being played. In such an embodiment, one haptic effect is output if a user plays the "C-E-G" chord and a different haptic effect is output if a user plays the "D-F-A" chord. Thus, a hearing impaired user or a user that wants sound on the device to be muted, can practice playing the simulated piano 710 and determine which chords are being played based upon one or more haptic effects output by the device 200. In another embodiment, the intensity of one or more haptic effects output by the device 200 may be increased or decreased as a user increases or decreases, respectfully, the pressure on various contacts on the simulated keyboard 710. Thus, a user can simulate playing a keyboard by pressing locations on the touch-sensitive display 230 corresponding with the various notes that the user wishes to play and can receive haptic feedback indicating the note or notes that the user presses.

In one embodiment, the processor 210 executes software that determines whether the user is playing the correct notes at the correct time for a given song. For example, for a particular song the notes "C" and "E" may need to be played simultaneously followed by the notes "D", "F", and "A" played simultaneously. If the user incorrectly presses notes "C" and "F" instead of notes "C" and "E" the device 200 may output a haptic effect alerting the user that an incorrect note has been played. Likewise, if the user correctly plays notes "D" and "E" simultaneously and plays notes "D", "F", and "A" simultaneously but with an incorrect timing, (i.e. the notes are played too fast or too slowly), the device 200 may output a different haptic effect alerting the user that their timing was incorrect.

In another embodiment, a first multi-pressure touch-sensitive input device 200 is in communication with a second multi-pressure touch-sensitive input device 200. In this embodiment, the touch-sensitive display 230 of the first device 200 may display the same information as the touch-sensitive display 230 of the second device 200. For example, both devices may display a keyboard as shown in FIG. 7. The processor 210 of the first device 200 and the processor 210 of the second device 200 may execute software on the memory 220 of each respective device such that the user interacting with the first device 200 is supposed to play one portion of a song and another user interacting with the second device 200 is supposed to play another portion of a song. In one embodiment, if the first user incorrectly plays a note on the first device 200, then a haptic effect is output by the first device 200. In another embodiment, if the first user incorrectly plays a note on the first device 200, the first device sends a command or instruction to a second device to output a haptic effect and the second device outputs a haptic effect. In yet another embodiment, if the first user incorrectly plays a note on the first device 200, the first device 200 sends data to the second device 200 regarding the incorrect note that the first user played and the second device 200 determines whether a haptic effect, if any, needs to be output on the second device 200 or on first device 200, or both.

Illustrative Method of Detecting and Responding to a Contact

Figure 8:
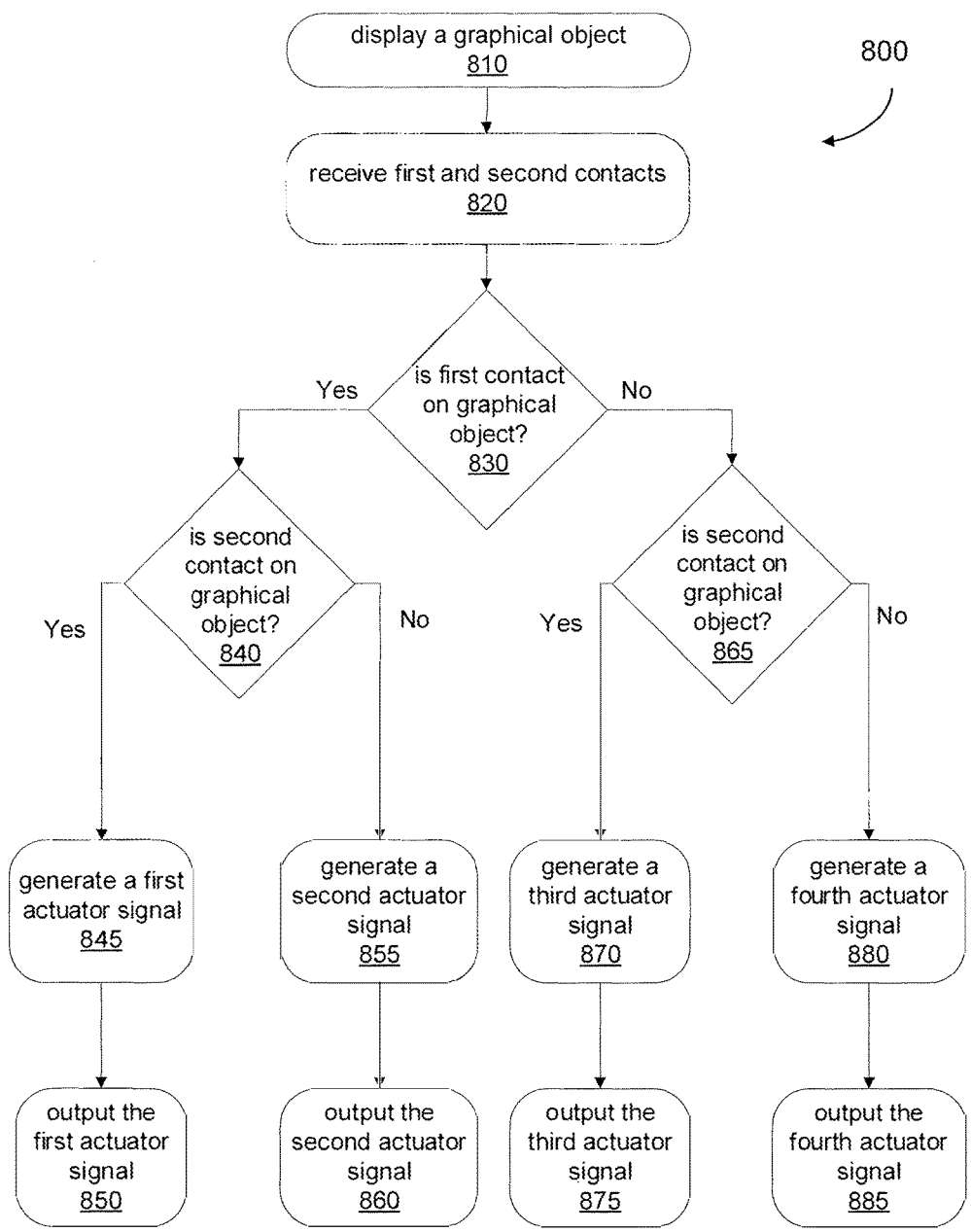
FIG. 8 illustrates a flow chart directed to a method of detecting and responding to a contact on a multi-pressure touch-sensitive input device in accordance with an embodiment of the present invention.

Referring now to FIG. 8, FIG. 8 illustrates a flow chart directed to a method 800 of outputting an actuator signal in a multi-pressure touch-sensitive input device 200 in accordance with an embodiment of the present invention. The description of the method 800 of FIG. 8 will be made with respect to the device 200 shown in FIG. 2 and the example shown in FIG. 9.

The method shown in FIG. 8 begins in block 810 when a graphical object is displayed. For example, in FIG. 9, a graphical object 910 is displayed on the touch-sensitive display 230. After displaying the graphical object, the method 800 proceeds to block 820.

In block 820, a first contact and a second contact are received. For example, in the embodiment shown in FIG. 9, a user can interact with the device 200 by contacting the touch-sensitive display 230 with a finger. In this embodiment, as the user interacts with the device 200, the processor 210 is provided with information, such as a first x, y coordinate and a first pressure, associated with a first contact from a first finger on the touch-sensitive display 230. In addition, as the user interacts with the device 200, the processor 210 is provided with information, such as a second x, y coordinate and a second pressure, associated with a second contact from a second finger on the touch-sensitive display 230. In some embodiments, the first contact and the second contact on the touch-sensitive display may need to occur substantially simultaneously in order for the processor 210 to receive information a first and a second contact.

Once a first contact and a second contact are received, the method 800 proceeds to block 830. In block 830, a determination is made as to whether the first contact is in a location corresponding to the graphical object. For example, in the embodiment shown in FIG. 9, if the location of the first contact corresponds to a location where the graphical object 910 is displayed on the touch-sensitive display 230, then the processor 210 determines that the first contact is a contact on the graphical object. However, in this embodiment, if the location of the first contact does not correspond to a location where the graphical object 910 is displayed on the touch-sensitive display 230, then the processor 210 determines that the first contact is not on the graphical object. If the first contact is on the graphical object, then the method 800 proceeds to block 840; otherwise, it proceeds to block 865.

In block 840, a determination is made as to whether the second contact is in a location corresponding to the graphical object. For example, in FIG. 9, if the location of the second contact corresponds to a location where the graphical object 910 is displayed on the touch-sensitive display 230, then the processor 210 determines that the second contact is a contact on the graphical object. However, in this embodiment, if the location of the second contact does not correspond to a location where the graphical object 910 is displayed on the touch-sensitive display 230, then the processor 210 determines that the second contact is not on the graphical object. If the second contact is on the graphical object, then the method 800 proceeds to block 845; otherwise, it proceeds to block 855.

In block 845, the processor 210 generates a first actuator signal. For example, in FIG. 9, if the first contact is on the graphical object 910 and the second contact is also on the graphical object 910, then the processor 210 determines that a response is to enlarge the size of the graphical object 910 displayed on the touch-sensitive display 230. In addition, in this embodiment, the processor 210 determines that a response is to output a haptic effect that indicates that the size of the graphical object 910 displayed on the touch-sensitive display 230 is being enlarged. In this embodiment, the processor 210 generates a first actuator signal configured to cause actuator 240 to output a haptic effect that indicates that the size of the graphical object 910 displayed on the touch-sensitive display 230 is being enlarged, such as a increasing-frequency or intensity vibration. In addition, the processor 210 may generate a first actuator signal that also comprises a haptic effect to indicate the two contacts on the object, such as a pop or jolt. In addition, processor 210 generates a display signal configured to cause the touch-sensitive display 230 to enlarge the size of the graphical object 910 displayed on the touch-sensitive display 230.

Figure 9:
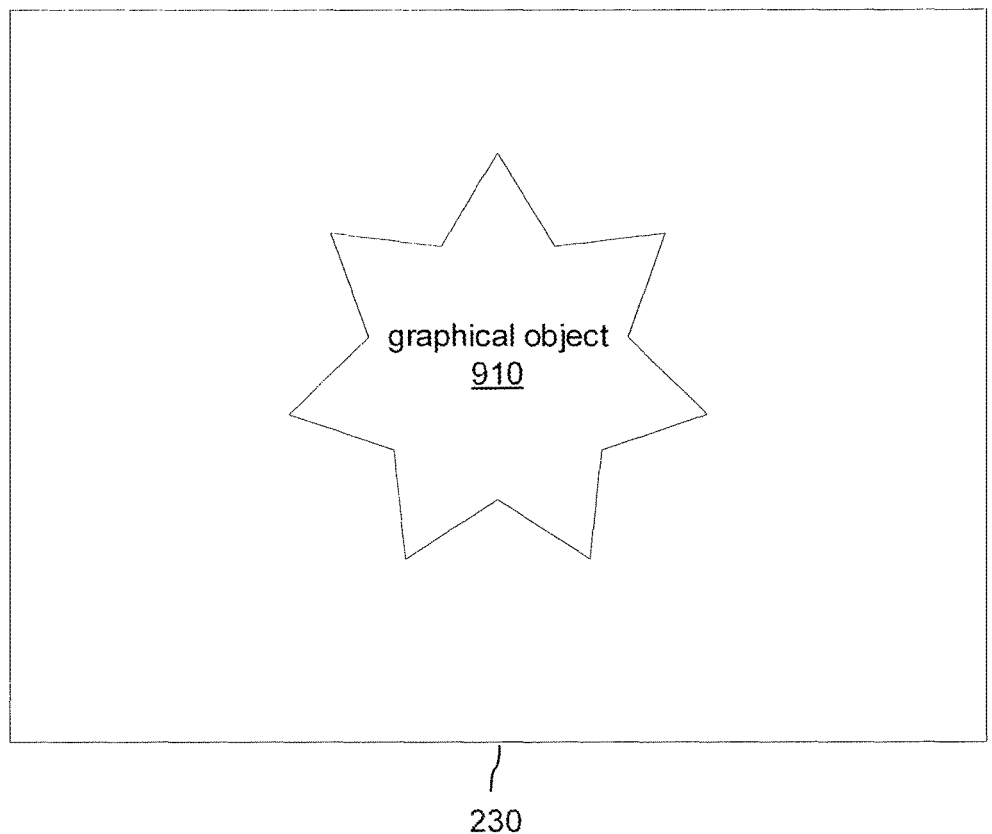
FIG. 9 illustrates an operation of a multi-pressure touch-sensitive input device in accordance with an embodiment of the present invention.

Referring still to FIG. 9 and in reference to block 845, in one embodiment, the processor 210 determines that if the pressure of the first contact is greater than a threshold pressure then the size of the graphical object 910 displayed on the touch-sensitive display 230 needs to be enlarged. Otherwise, in this embodiment, the processor 210 may determine that no response is needed. In another embodiment, the processor 210 determines that the size of the graphical object 910 displayed on the touch-sensitive display 230 needs to be enlarged until the pressure of the second contact is below a threshold pressure.

Once the first actuator signal has been generated as shown in block 845, the processor 210 outputs the first actuator signal as shown in block 850. For example, in the embodiment shown in FIG. 9, the processor 210 outputs the generated first actuator signal to actuator 240. Actuator 240 receives the first actuator signal from the processor 210 and outputs a haptic effect indicating that the size of the graphical object 910 displayed on the touch-sensitive display 230 is being enlarged. In addition, in the embodiment shown in FIG. 9, the processor 210 outputs the generated display signal to the touch-sensitive display 230 and the touch-sensitive display 230 updates the size of the graphical object 910 shown on the touch-sensitive display 230.

In block 855, the processor 210 generates a second actuator signal. For example, in FIG. 9, if the first contact is on the graphical object 910 and the second contact is not on the graphical object 910, then the processor 210 determines that a response is to change the color of the graphical object 910. In addition, in this embodiment, the processor 210 determines that a response is to output a haptic effect that indicates that the color of the graphical object 910 displayed on the touch-sensitive display 230 is changing. For example, the processor 210 may determine that a pop or jolt effect should be output each time the color is changed. In this embodiment, the processor 210 generates a second actuator signal configured to cause actuator 260 to output a haptic effect indicating that the color of the graphical object 910 displayed on the touch-sensitive display 230 is changing. In addition, the processor 210 generates a display signal configured to cause the touch-sensitive display 230 to change the color of the graphical object 910 displayed on the touch-sensitive display 230.

Referring still to FIG. 9 and in reference to block 855, in one embodiment, the processor 210 determines that if the pressure of the first contact is greater than a threshold pressure then the color of the graphical object 910 displayed on the touch-sensitive display 230 needs to be changed. Otherwise, in this embodiment, the processor 210 may determine that no response is needed. In another embodiment, the processor 210 determines that the color of the graphical object 910 displayed on the touch-sensitive display 230 needs to be changed until the pressure of the second contact is below a threshold pressure. For example, the color of the graphical object 910 may change at predetermined time intervals from yellow to green to blue until the pressure of the second contact is below a threshold pressure. In one embodiment, the color of the graphical object 910 changes based on the pressure. For example, the color of the graphical object 910 may change from red to yellow to green to blue as the pressure of the first contact increase.

Once the second actuator signal has been generated as shown in block 855, the processor 210 outputs the second actuator signal as shown in block 860. For example, in the embodiment shown in FIG. 9, the processor 210 outputs the generated second actuator signal to actuator 260. Actuator 260 receives the second actuator signal from the processor 210 and outputs a haptic effect indicating that the color of the graphical object 910 displayed on the touch-sensitive display 230 is being changed. In addition, in the embodiment shown in FIG. 9, the processor 210 outputs the generated display signal to the touch-sensitive display 230 and the touch-sensitive display 230 updates the color of the graphical object 910 shown on the touch-sensitive display 230.

If it was determined in block 830 that the first contact was not in a location corresponding to the graphical object, the method proceeds to block 865. In block 865, a determination is made as to whether the second contact is in a location corresponding to the graphical object. For example, in FIG. 9, if the location of the second contact corresponds to a location where the graphical object 910 is displayed on the touch-sensitive display 230, then the processor 210 determines that the second contact is a contact on the graphical object. However, in this embodiment, if the location of the second contact does not correspond to a location where the graphical object 910 is displayed on the touch-sensitive display 230, then the processor 210 determines that the second contact is not on the graphical object. If the second contact is on the graphical object, then the method 800 proceeds to block 870; otherwise, it proceeds to block 880.

In block 870, the processor 210 generates a third actuator signal. For example, in FIG. 9, if the first contact is not on the graphical object 910 and the second contact is on the graphical object 910, then the processor 210 determines that a response is to move the location of where the graphical object 810 is displayed on the touch-sensitive display 230. In addition, in this embodiment, the processor 210 determines that a response is to output a haptic effect that indicates that the location of the graphical object 910 displayed on the touch-sensitive display 230 is changing. In this embodiment, the processor 210 generates a third actuator signal configured to cause actuator 240 to output a haptic effect indicating that the location of the graphical object 910 displayed on the touch-sensitive display 230 is changing. In addition, the processor 210 generates a display signal configured to cause the touch-sensitive display 230 to change the location of where the graphical object 910 is displayed on the touch-sensitive display 230.

Referring still to FIG. 9 and in reference to block 870, in one embodiment, the processor 210 determines that if the pressure of the first contact is greater than a threshold pressure, then a response is to move the graphical object 910 in an upward direction. If the pressure of the first contact is less than the threshold pressure, then a response is to move the graphical object 910 in a downward direction. In some embodiments, if the pressure of the second contact is greater than a threshold pressure, then a response is to move the graphical object to the left. If the pressure of the second contact is less than the threshold pressure, then a response is to move the graphical object 910 to the right. In some embodiments, a response may be determined based upon both the first pressure and the second pressure. For example, in one embodiment, a response may be to move location of the graphical object 910 both upwards and to the left based upon the first pressure and the second pressure. In another embodiment, the location of the graphical object 910 may be changed based upon a change in location of the contact. Thus, if the location of the first contact moves in an upward direction, the location of the graphical object 910 displayed on the touch-sensitive display 230 may also be moved in an upward direction. In one embodiment, both the location and the color or size of the graphical object 910 displayed on the touch-sensitive display 230 may be changed based upon the location and pressure of both the first contact and the second contact.

Once the third actuator signal has been generated as shown in block 870, the processor 210 outputs the third actuator signal as shown in block 875. For example, some embodiments disclosed above, the processor 210 outputs the generated third actuator signal to actuator 240. Actuator 240 receives the third actuator signal from the processor 210 and outputs a haptic effect indicating that the location of where the graphical object 910 is displayed on the touch-sensitive display 230 is being changed. In addition, embodiments shown with respect to FIG. 9, the processor 210 outputs the generated display signal to the touch-sensitive display 230 and the touch-sensitive display 230 updates the location of the graphical object 910 shown on the touch-sensitive display 230.

In block 880, the processor 210 generates a fourth actuator signal. For example, in FIG. 9, if the first contact is not on the graphical object 910 and the second contact is not on the graphical object 910, then the processor 210 determines that a response is to reduce the size of the graphical object 910. In addition, in this embodiment, the processor 210 determines that a response is to output a haptic effect that indicates that the size of the graphical object 910 displayed on the touch-sensitive display 230 is being reduced. In this embodiment, the processor 210 generates a fourth actuator signal configured to cause actuator 260 to output a haptic effect indicating that the size of the graphical object 910 displayed on the touch-sensitive display 230 is being reduced, such as a decreasing-frequency or intensity vibration. In addition, the processor 210 generates a display signal configured to cause the touch-sensitive display 230 to reduce the size of the graphical object 910 displayed on the touch-sensitive display 230.

Referring still to FIG. 9 and in reference to block 880, in one embodiment, the processor 210 determines that if the change in location of the first contact is in a rightward direction and the change in location of the second contact is in a leftward direction, then the size of the graphical object 910 displayed on the touch-sensitive display 230 needs to be reduced. In another embodiment, the processor 210 determines that if the change in location of the first contact is in an opposite direction of the change in location of the second contact and the locations of the first and second contacts are changing such that the first contact and second contact are coming closer together, then the size of the graphical object 910 displayed on the touch-sensitive display 230 needs to be reduced. In one embodiment, in addition to reducing the size of the graphical object 910 displayed on the touch-sensitive display 230 the processor may determine a response that the color of the graphical object 910 needs to be changed or that the location of the graphical object 910 needs to move based upon the pressure of the first contact, the pressure of the second contact, or both.

Once the fourth actuator signal has been generated as shown in block 880, the processor 210 outputs the fourth actuator signal as shown in block 885. For example, in the some embodiments discussed above with respect to FIG. 9, the processor 210 outputs the generated fourth actuator signal to actuator 260. Actuator 260 receives the fourth actuator signal from the processor 210 and outputs a haptic effect indicating that the size of the graphical object 910 displayed on the touch-sensitive display 230 is being reduced. In addition, in embodiments shown in FIG. 9, the processor 210 outputs the generated display signal to the touch-sensitive display 230 and the touch-sensitive display 230 updates the size of the graphical object 910 shown on the touch-sensitive display 230.

Another embodiment of the present invention that implements the method 800 shown in FIG. 8 and that will be described with respect to the device shown in FIG. 2 is a networked application. In this embodiment, two multi-pressure touch-sensitive input devices 200 are in communication with each other using respective network interfaces 250. For example, in one embodiment the devices 200 communicate with each other over the Internet. In another embodiment, the communication may be over a wireless network.

In various embodiments, one or more haptic effects may be output based on two or more contacts on one device and two or more contacts on another device. For example, two devices 200 may be in communication with each other and a user of one device 200 may touch a first location on the display 230 with a first finger and may touch a second location on the display 230 with a second finger. Likewise, a user of the second device 200 may touch a first location on the display 230 with a first finger and may touch a second location on the display 230 with a second finger. In one embodiment, the location of the first contact on the first device substantially corresponds with the location of the first contact on the second device and the location of the second contact on the first device substantially corresponds with the location of the second contact on the second device, then a response may occur. For example, in one embodiment, the response may be that access is granted to either or both users to a file, website, application, etc. In embodiments, the response may include one or more haptic effects indicating that access is granted or that the locations of both contacts on each device are substantially at the same location. In other embodiments, one or more haptic effects may be output to either device or both devices indicating that at least one of the contacts does not match if any of the contacts are not at a substantially similar location.

In some embodiments, one or more haptic effects may be output based on the pressure of a contact on a first device and a pressure of a contact on a second device where the first device and the second device are in communication with each other. For example, in a wrestling application where two or more devices are in communication with each other, a user of one of the devices may contact the touch-sensitive display 230 at one location and with a first pressure. A user of another device may contact the touch-sensitive display 230 at a second location corresponding with the first location on the display of the first device and with a second pressure. In this embodiment, one or more haptic effects may be output on either device or both devices based on the pressure of the contacts. For example, in one embodiment, if the pressure of the first contact on the first device is greater than the pressure of the second contact on the second device, then a haptic effect may be output on the second device indicating that the first user is punching harder than the second user. In another embodiment, if the pressure of the second contact on the second device is greater than the pressure of the first contact on the first device, then a haptic effect may be output on the first device indicating that the second user is pushing or grappling harder than the first user and another haptic effect may be output on the second device indicating that the second user is currently winning the match.

In one embodiment, one or more haptic effects may be output to a device in communication with another device. For example, a first device such as a touch-sensitive mobile phone may be in communication with a second device such as a wearable arm strap that has one or more actuators. In response to various multi-touch, multi-pressure interactions on the touch-sensitive mobile phone, the phone may send one or more actuation commands to the arm strap. In the embodiment, the arm strap receives one or more of the actuation commands and, in response, outputs one or more haptic effects. Thus, in embodiments, a haptic effect generation device may be used to output one or more haptic effects. The haptic effect generation device can be separate from a touch-sensitive device which receives multi-touch, multi-pressure contacts.

General

While the methods and systems herein are described in terms of software executing on various machines, the methods and systems may also be implemented as specifically-configured hardware, such as a field-programmable gate array (FPGA) specifically to execute the various methods. For example, referring again to FIGS. 1-2, embodiments can be implemented in digital electronic circuitry, or in computer hardware, firmware, software, or in a combination of thereof. In one embodiment, a device may comprise a processor or processors. The processor comprises a computer-readable medium, such as a random access memory (RAM) coupled to the processor. The processor executes computer-executable program instructions stored in memory, such as executing one or more computer programs for editing an image. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example computer-readable media, that may store instructions that, when executed by the processor, can cause the processor to perform the steps described herein as carried out, or assisted, by a processor. Embodiments of computer-readable media may comprise, but are not limited to, an electronic, optical, magnetic, or other storage device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code for carrying out one or more of the methods (or parts of methods) described herein.

The foregoing description of some embodiments of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the invention.

Reference herein to "one embodiment" or "an embodiment" means that a particular feature, structure, operation, or other characteristic described in connection with the embodiment may be included in at least one implementation of the invention. The invention is not restricted to the particular embodiments described as such. The appearance of the phrase "in one embodiment" or "in an embodiment" in various places in the specification does not necessarily refer to the same embodiment. Any particular feature, structure, operation, or other characteristic described in this specification in relation to "one embodiment" may be combined with other features, structures, operations, or other characteristics described in respect of any other embodiment.

That which is claimed is:

1. A method, comprising:
    receiving a first sensor signal from a touch-sensitive display in response to a first contact on the touch-sensitive display, the first sensor signal comprising a first location and a first pressure corresponding to the first contact;
    receiving a second sensor signal from the touch-sensitive display in response to a second contact on the touch-sensitive display substantially simultaneously with the first contact, the second sensor signal comprising a second location and a second pressure corresponding to the second contact;
    determining a graphical object displayed on the touch-sensitive display based on the first and second locations;
    determining a multi-pressure input based on the first and second pressures;
    changing a display of the graphical object based on the determined multi-pressure input;
    generating a signal based at least in part on the multi-pressure input, the signal configured to cause a haptic effect; and
    outputting the signal to a haptic output device.

2. The method of claim 1, wherein the haptic output device comprises an actuator and the signal comprises an actuator signal configured to cause the actuator to output the haptic effect.

3. The method of claim 1, wherein the signal is further based on a first pressure threshold and at least one of the first or second pressures.

4. The method of claim 1, wherein the signal is further based on comparing the first pressure to a first pressure threshold, and comparing the second pressure to a second pressure threshold.

5. The method of claim 1, wherein the signal is based at least in part on a difference between the first pressure and the second pressure of the second contact.

6. The method of claim 1, wherein the haptic effect comprises at least one of a vibration, a friction, a texture, or a deformation.

7. The method of claim 2, further comprising:
    determining a second actuator signal based at least in part on the first sensor signal and the second sensor signal; and
    outputting the second actuator signal to the haptic output device.

8. The method of claim 2, wherein the actuator comprises a piezo-electric actuator, a rotary motor, or a linear resonant actuator.

9. The method of claim 1, wherein outputting the signal comprises sending the signal to a second device in communication with the touch-sensitive display, wherein the second device comprises the haptic output device.

10. The method of claim 1, wherein the determination comprises a determination that the first location corresponds to the graphical object on the touch-sensitive display and the second location corresponds to the graphical object on the touch-sensitive display.

11. The method of claim 1, wherein the determination comprises a determination that the first location corresponds to the graphical object on the touch-sensitive display and the second location does not correspond to the graphical object on the touch-sensitive display.

12. The method of claim 1, wherein the determination comprises a determination that the first location does not correspond to the graphical object on the touch-sensitive display and the second location corresponds to the graphical object on the touch-sensitive display.

13. A system, comprising:
    a touch-sensitive display; and
    a processor in communication with the touch-sensitive display and configured to:
        receive a first sensor signal from the touch-sensitive display in response to a first contact on the touch-sensitive display, the first sensor signal comprising a first location and a first pressure corresponding to the first contact;

receive a second sensor signal from the touch-sensitive display in response to a second contact on the touch-sensitive display substantially simultaneously with the first contact, the second sensor signal comprising a second location and a second pressure corresponding to the second contact;

determine a graphical object displayed on the touch-sensitive display based on the first and second locations;

determine a multi-pressure input based on the first and second pressures;

change a display of the graphical object based on the determined multi-pressure input;

generate a signal based at least in part on multi-pressure input, the signal configured to cause a haptic effect; and output the signal to a haptic output device.

14. The system of claim 13, wherein a portable computing device comprises the touch-sensitive display, and wherein the portable computing device comprises a smartphone or a tablet.

15. The system of claim 13, wherein the haptic output device comprises a piezo-electric actuator or a linear resonant actuator.

16. The system of claim 13, wherein the determination comprises a determination that the first location corresponds to the graphical object and the second location corresponds to the graphical object.

17. A non-transitory computer-readable medium comprising executable instructions which, when executed by a processor, cause the processor to:

receive a first sensor signal from a touch-sensitive display in response to a first contact on the touch-sensitive display, the first sensor signal comprising a first location and a first pressure corresponding to the first contact;

receive a second sensor signal from the touch-sensitive display in response to a second contact on the touch-sensitive display substantially simultaneously with the first contact, the second sensor signal comprising a second location and a second pressure corresponding to the second contact;

determine a graphical object displayed on the touch-sensitive display based on the first and second locations;

determine a multi-pressure input based on the first and second pressures;

change a display of the graphical object based on the determined multi-pressure input;

generate a signal based at least in part on the multi-pressure input, the signal configured to cause a haptic effect; and output the signal outputting the signal to haptic output device.

18. The non-transitory computer-readable medium of claim 17, wherein the determination comprises a determination that the first location is on the graphical object on the touch-sensitive display.

19. The non-transitory computer-readable medium of claim 18, wherein the determination comprises a determination that the second location is not on the graphical object on the touch-sensitive display.

20. The non-transitory computer-readable medium of claim 18, wherein the determination comprises a determination that the second location is not on any graphical object on the touch-sensitive display.

21. The non-transitory computer-readable medium of claim 17, wherein the signal is configured to cause:

a first haptic effect if the determination comprises a determination that the first location corresponds to the graphical object and the second location corresponds to the graphical object;

a second haptic effect if the determination comprises a determination that the first location corresponds to the graphical object and the second location does not correspond to the graphical object;

a third haptic effect if the determination comprises a determination that the first location does not correspond to the graphical object and the second location corresponds to the graphical object; and a fourth haptic effect if the determination comprises a determination that the first location does not correspond to the graphical object and the second location does not correspond to the graphical object, and wherein each of the first haptic effect, the second haptic effect, the third haptic effect, and the fourth haptic effect is a different haptic effect.

* * * * *